United States Patent
Choi et al.

(10) Patent No.: US 10,788,982 B2
(45) Date of Patent: Sep. 29, 2020

(54) MOBILE TERMINAL AND METHOD FOR CONTROLLING THE SAME

(71) Applicant: LG ELECTRONICS INC., Seoul (KR)

(72) Inventors: Huran Choi, Seoul (KR); Younhwa Choi, Seoul (KR); Yoojin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 497 days.

(21) Appl. No.: 15/601,200

(22) Filed: May 22, 2017

(65) Prior Publication Data
US 2018/0150216 A1 May 31, 2018

(30) Foreign Application Priority Data
Nov. 30, 2016 (KR) .......................... 10-2016-0161058

(51) Int. Cl.
| | |
|---|---|
| *G06F 3/14* | (2006.01) |
| *G06F 3/0488* | (2013.01) |
| *G06F 3/0482* | (2013.01) |
| *G06F 3/0354* | (2013.01) |
| *G06F 3/041* | (2006.01) |
| *H04W 88/02* | (2009.01) |

(52) U.S. Cl.
CPC ...... *G06F 3/04886* (2013.01); *G06F 3/03547* (2013.01); *G06F 3/0412* (2013.01); *G06F 3/0482* (2013.01); *G06F 3/04883* (2013.01); *G06F 2203/04803* (2013.01); *H04M 2250/12* (2013.01); *H04W 88/02* (2013.01)

(58) Field of Classification Search
CPC ........................................................ G06F 3/14
USPC ................... 715/778, 864; 345/156, 173
See application file for complete search history.

(56) References Cited

U.S. PATENT DOCUMENTS

| | | | | |
|---|---|---|---|---|
| 8,902,179 | B1* | 12/2014 | Ota | G06F 3/04886 |
| | | | | 345/156 |
| 10,423,318 | B1* | 9/2019 | Ko | G06F 3/0482 |
| 2012/0154314 | A1* | 6/2012 | Wu | G06F 1/1698 |
| | | | | 345/173 |
| 2013/0179825 | A1* | 7/2013 | Seo | G06F 3/0484 |
| | | | | 715/778 |
| 2016/0266774 | A1 | 9/2016 | Kim et al. | |

FOREIGN PATENT DOCUMENTS

| | | |
|---|---|---|
| EP | 2947867 A1 | 11/2015 |
| EP | 2981071 A2 | 2/2016 |

OTHER PUBLICATIONS

Apple Inc., "iPad User Guide for iOS 7.1 Software," Mar. 10, 2014, XP055234439, pp. 1-139 (140 pages total), https://manuals.info.apple.com/MANUALS/1000/MA1683/en_US/ipad_ios7_user_guide.pdf.

\* cited by examiner

*Primary Examiner* — Ruay Ho
(74) *Attorney, Agent, or Firm* — Birch, Stewart, Kolasch & Birch, LLP

(57) ABSTRACT

Disclosed are a mobile terminal and method for controlling the same. The present invention provides a mobile terminal including a sensing unit, a touch screen configured to be partitioned into a center area and a side area, and a control unit, wherein the control unit is configured to sense a first input signal for selecting one of the center area and the side area while displaying a video on the center area and display at least one object on the side area based on the first input signal.

17 Claims, 20 Drawing Sheets

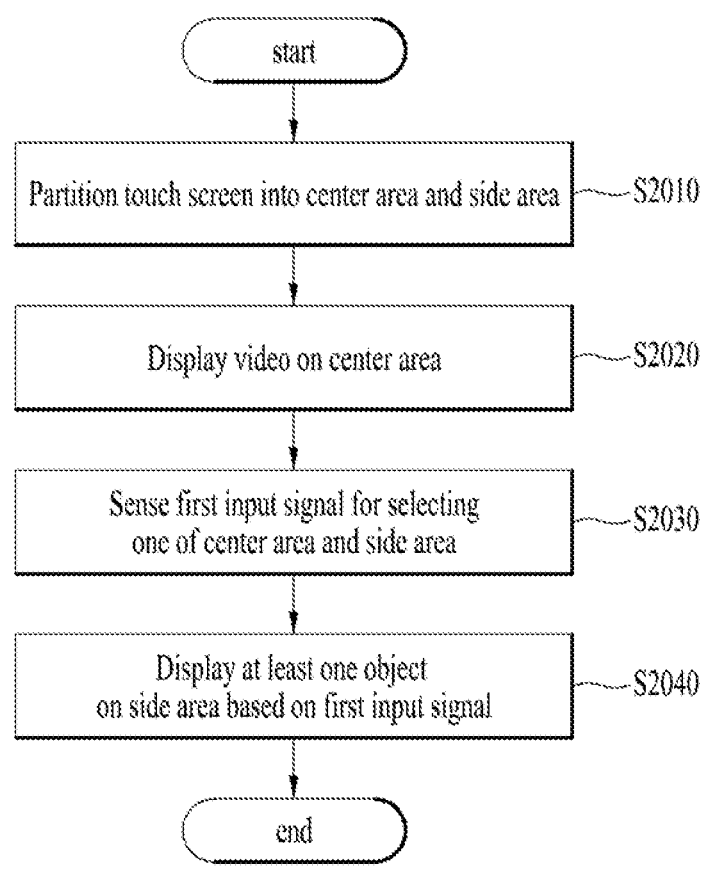

MOBILE TERMINAL AND METHOD FOR CONTROLLING THE SAME

Pursuant to 35 U.S.C. § 119(a), this application claims the benefit of earlier filing date and right of priority to Korean Application No. 10-2016-0161058, filed on Nov. 30, 2016, the contents of which are hereby incorporated by reference herein in its entirety.

BACKGROUND OF THE INVENTION

Field of the Invention

The present invention relates to a mobile terminal and method for controlling the same, and more particularly, to a mobile terminal for displaying an object on a side area of a touch screen based on an input signal for selecting one of a center area and the side area while displaying a video on the center area of the touch screen and method for controlling the same.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, a mobile terminal with a screen ratio of 18:9, which is greater than the conventional screen ratio of 16:9, has been developed. However, it is expected that in spite of the 18:9 screen ratio, the mobile terminal will still display contents suitable for the 16:9 screen ratio. Thus, the top/bottom or left/right area of the mobile terminal with the 18:9 screen ratio remains unused.

Therefore, a method for utilizing the side area of the enlarged touch screen needs to be considered for users having such mobile terminals with the screen ratio greater than the conventional one.

SUMMARY OF THE INVENTION

Accordingly, an object of the present invention is to address the above-noted and other problems.

Another object of the present invention is to provide a mobile terminal for displaying an object on a side area of a touch screen according to an input signal for selecting one of a center area and the side area while displaying a video on the center area of the touch screen and method for controlling the same.

It will be appreciated by persons skilled in the art that the objects that could be achieved with the present invention are not limited to what has been particularly described hereinabove and the above and other objects that the present invention could achieve will be more clearly understood from the following detailed description.

The above identified objects are solved by the features of the independent claims. To achieve these objects and other advantages and in accordance with the purpose of the invention, as embodied and broadly described herein, a mobile terminal according to the present invention may include a sensing unit, a touch screen configured to be partitioned into a center area and a side area, and a control unit, wherein the control unit may be configured to sense a first input signal for selecting one of the center area and the side area while displaying a video on the center area and display at least one object on the side area based on the first input signal. Preferably, the center area and the side area are each areas of a touch surface of the touch screen. Preferably, the side area is a peripheral area of the touch screen. Preferably, the side area is arranged adjacent to the center area.

According to one embodiment of the present invention, the side area may include a first area and a second area.

According to one embodiment of the present invention, when the center area is selected by the first input signal, the object may correspond to a first controller for controlling the video.

According to one embodiment of the present invention, the control unit may be configured to display at least one preview thumbnail of the video on the first area.

According to one embodiment of the present invention, the control unit may be configured to display the first controller on the second area.

According to one embodiment of the present invention, when the control unit senses a second input signal, which is inputted on the center area in a predetermined manner, while displaying the preview thumbnail, the control unit may be configured to stop display of the preview thumbnail and display a second controller for controlling the video on the first area of the side area.

According to one embodiment of the present invention, when a remaining playback time of the video is equal to or smaller than a predetermined time, the control unit may be configured to stop display of the preview thumbnail and display a recommended video list on the side area.

According to one embodiment of the present invention, the recommended video list may include at least one of video thumbnails.

According to one embodiment of the present invention, when sensing a third input signal for selecting a first video thumbnail included in the recommended video list, the control unit may be configured to display a first video on the center area.

According to one embodiment of the present invention, when the side area is selected by the first input signal, the object may correspond to a third controller for controlling a system of the mobile terminal.

According to one embodiment of the present invention, the control unit may be configured to display at least one icon on the first area.

According to one embodiment of the present invention, the control unit may be configured to display the third controller on the second area.

According to one embodiment of the present invention, the mobile terminal may further include a wireless communication unit. In this case, the control unit may be configured to display a first icon on the first area and display a notification badge on the first icon when receiving an event associated with the first icon through the wireless communication unit.

According to one embodiment of the present invention, when sensing a fourth input signal for selecting the first icon, the control unit may be configured to display detailed information of the first icon on the first area.

According to one embodiment of the present invention, when sensing a fifth input signal corresponding to a drag of the first icon by a predetermined distance or more, the control unit may be configured to display detailed information of the first icon on the center area.

According to one embodiment of the present invention, when sensing a sixth signal for selecting the detailed information of the first icon, the control unit may be configured to display at least one emoji associated with the detailed information of the first icon on the second area.

According to one embodiment of the present invention, when sensing a seventh input signal corresponding to a drag in a first direction on the touch screen, the control unit may be configured to adjust the number of displayed objects.

According to one embodiment of the present invention, when sensing an eighth input signal corresponding to a drag in a second direction on the touch screen, the control unit may be configured to stop display of the object.

According to one embodiment of the present invention, the second direction may be opposite to the first direction.

According to one embodiment of the present invention, the control unit may be configured to adjust the number of the displayed objects based on a drag distance of the seventh input signal.

According to one embodiment of the present invention, when the control unit senses no input signal during a predetermined time while displaying the object, the control unit may be configured to stop display of the object.

According to one embodiment of the present invention, when sensing an input signal identical to the first input signal, the control unit may be configured to stop display of a controller.

In another aspect of the present invention, a method for controlling a mobile terminal may include: partitioning a touch screen into a center area and a side area; displaying a video on the center area; sensing a first input signal for selecting one of the center area and the side area; and displaying at least one object on the side area based on the first input signal.

Accordingly, the mobile terminal and method for controlling the same according to the present invention provide the following effects and/or advantages.

According to at least one embodiment of the present invention, a user can watch a video displayed on a center area of a touch screen. In addition, since a controller for controlling the video or an operating system of the mobile terminal is displayed on an area except that where the video is displayed, the mobile terminal can allow the user to be absorbed in watching the video.

According to at least one embodiment of the present invention, if a notification occurs while the user watches the video, the user can check the notification in an area except that where the video is displayed and thus be absorbed in watching the video.

Further scope of applicability of the present invention will become apparent from the detailed description given hereinafter. However, it should be understood that the detailed description and specific examples, while indicating preferred embodiments of the invention, are given by illustration only, since various changes and modifications within the scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 20 is a flowchart for explaining an embodiment of displaying an object based on an input signal on a side area of the mobile terminal according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
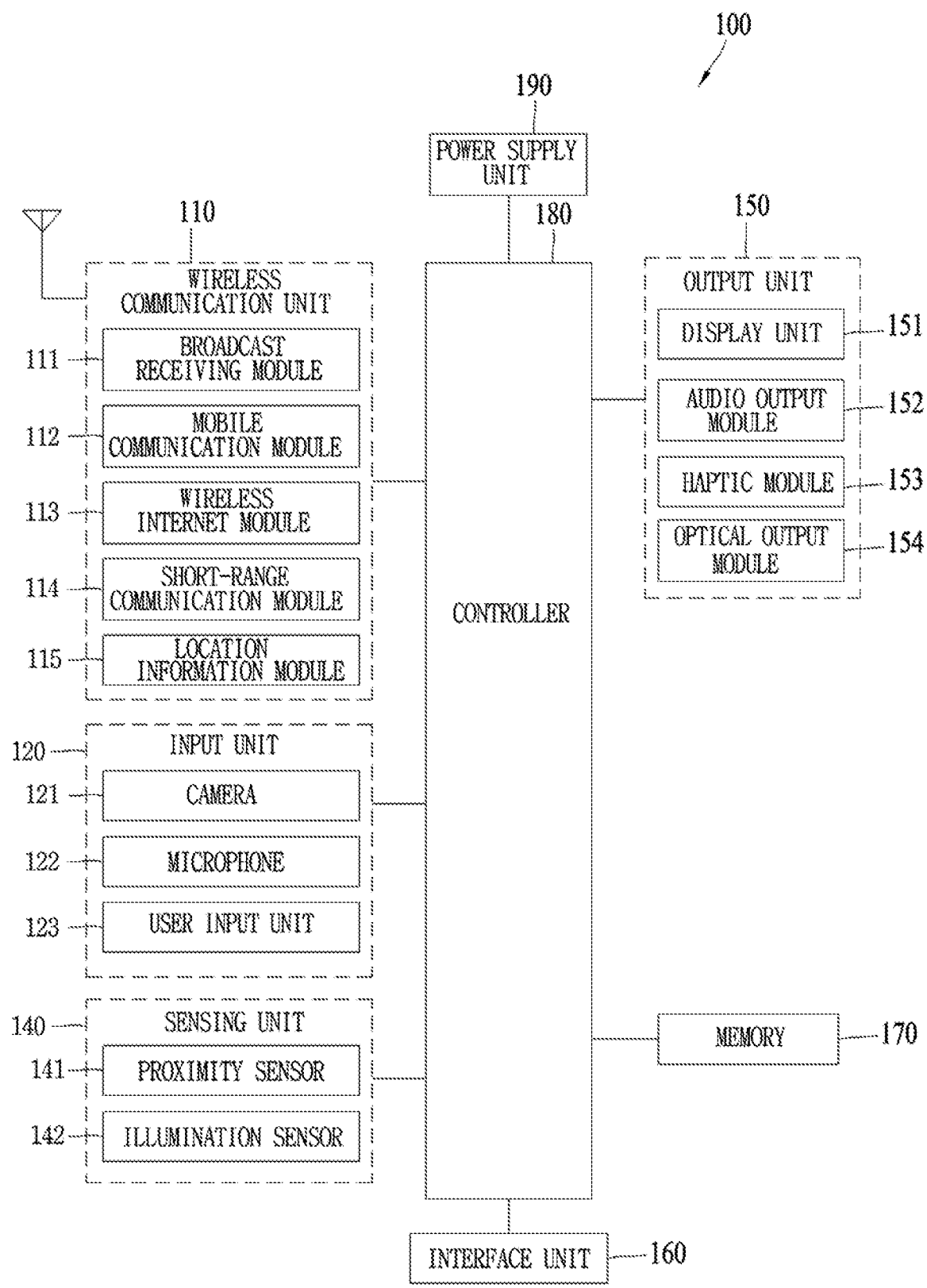
FIG. 1A is a block diagram of a mobile terminal in accordance with the present disclosure.
Figure 1B:
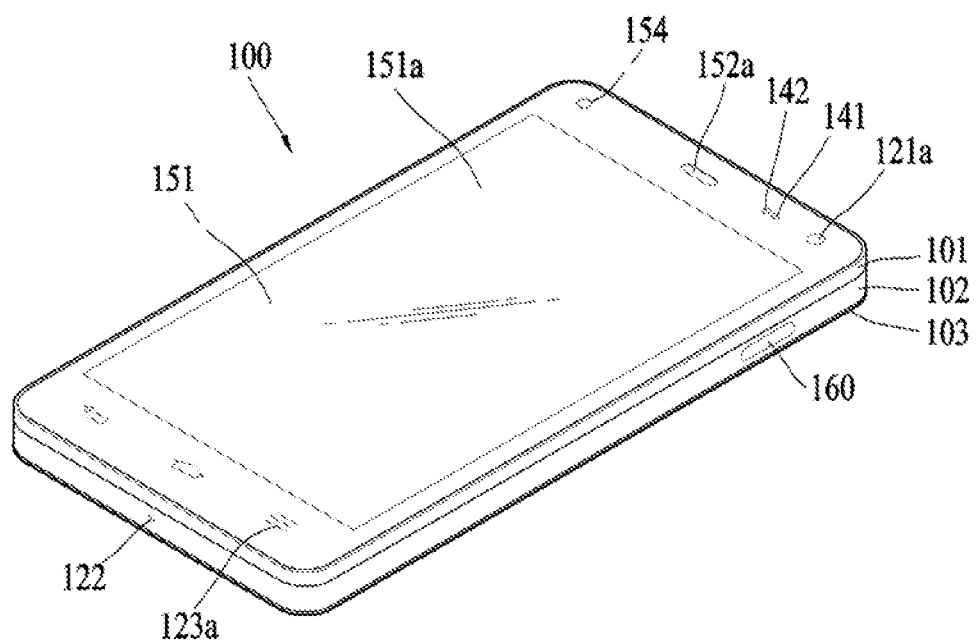
FIGS. 1B and 1C are conceptual views of one example of the mobile terminal, viewed from different directions.
Figure 1C:
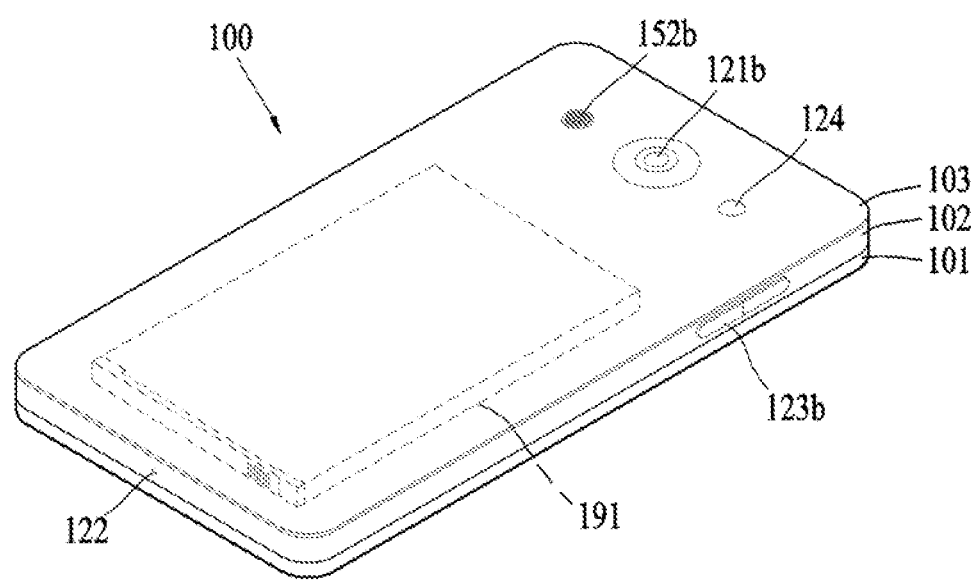

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
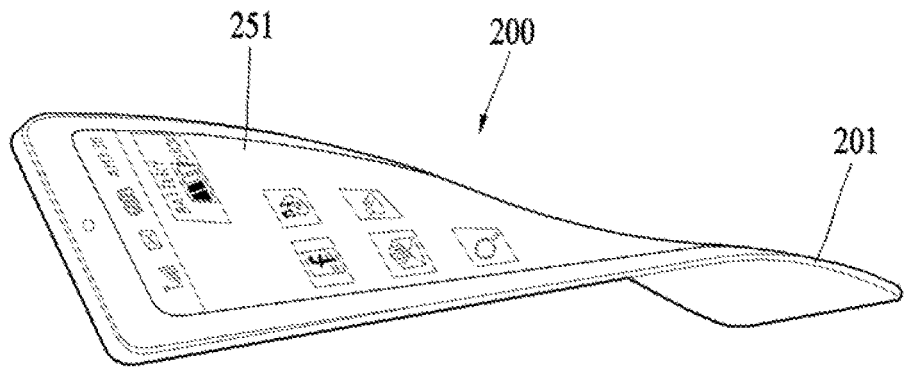
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
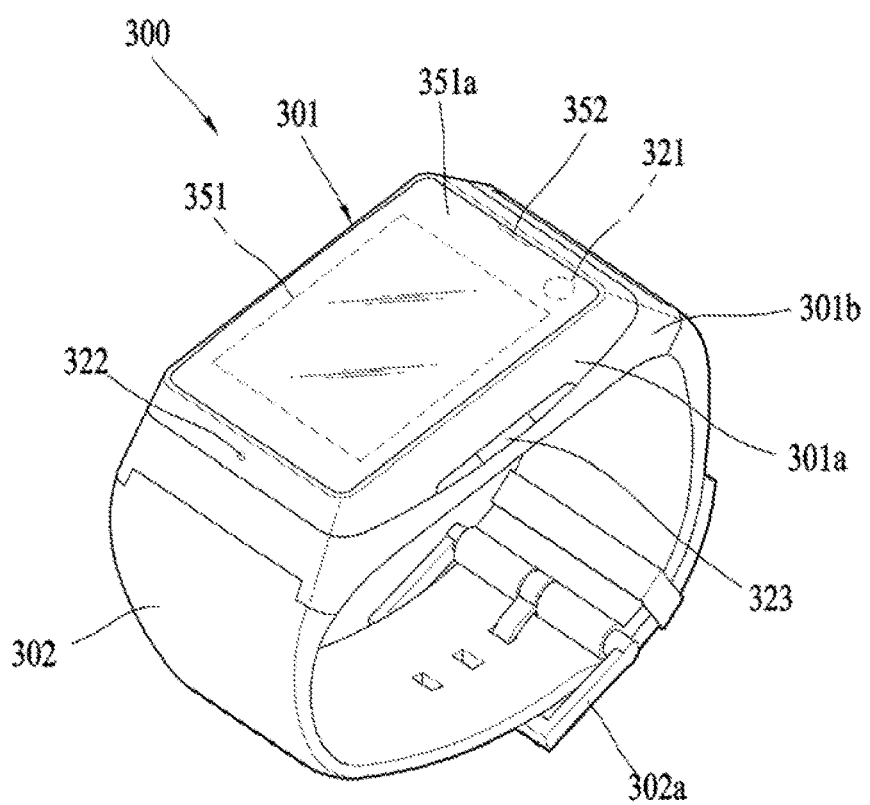
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

The mobile terminal, which will be hereinafter described with reference to FIGS. 4 to 19, can be implemented using one of the mobile terminals 100, 200, and 300 illustrated in FIGS. 1 to 3.

In the following description, the embodiments of the present invention will be explained with reference to FIGS. 5 to 19. In addition, the foregoing description with reference to FIGS. 1 to 3 is provided for ease in description and understanding of the embodiments of the present invention.

Figure 4:
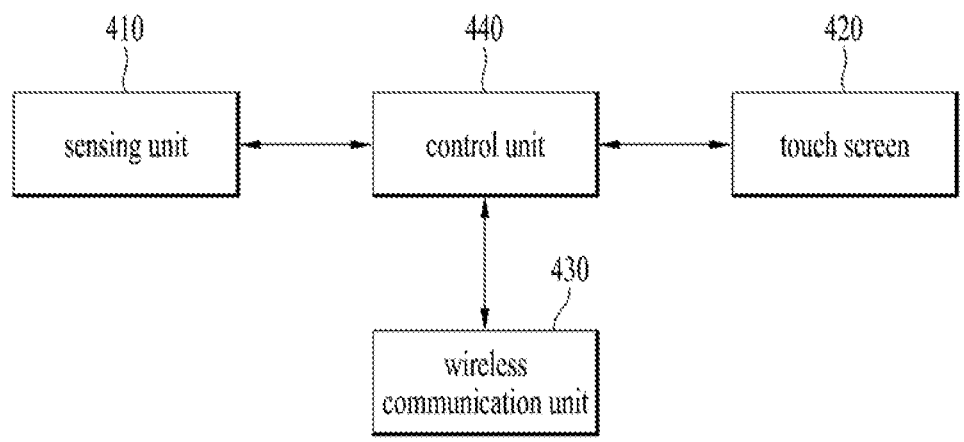
FIG. 4 is a diagram illustrating configuration modules of a mobile terminal according to one embodiment of the present invention.

FIG. 4 is a diagram illustrating configuration modules of the mobile terminal according to one embodiment of the present invention.

Referring to FIG. 4, the mobile terminal according to one embodiment of the present invention can include a sensing unit 410, a touch screen 420, a wireless communication unit 430, and a control unit 440.

The sensing unit 410 may be configured to sense not only various user inputs inputted into the mobile terminal but also an environment of the mobile terminal and deliver a sensing result to enable the control unit 440 to perform operation based on the sensing result. According to the present invention, the sensing unit 410 is disposed on the touch screen 420 so that the sensing unit 410 can directly perform a sensing function thereon. In addition, to implement the sensing unit 410, the sensing unit 140 of FIG. 1A may be used.

According to an embodiment of the present invention, the sensing unit 410 can sense an input signal for selecting one of a center area and a side area of the touch screen 420. In addition, the sensing unit 410 can sense an input signal for selecting an object displayed on the touch screen 420. It will be explained in detail in the following.

The touch screen 420 may be configured to display visual information. Here, the visual information may include a text, an indicator, an icon, a content, an application, an image, a video and the like. In addition, the visual information may be displayed on the touch screen 420 based on a control command from the control unit 440. According to the present invention, the touch screen 420 can be implemented using the display 151 of FIG. 1A or the display unit 351 of FIG. 3A.

According to one embodiment of the present invention, the touch screen 420 can be partitioned into the center area and the side area. Here, the side area may correspond to the remaining area of the touch screen 420 except the center area. In addition, the side area may include at least one area. However, the central and side areas of the touch screen 420 may be partitioned virtually rather than physically. Moreover, the touch screen 420 may display different objects on its central and side areas. Details will be described later with reference to FIG. 5.

The wireless communication unit 430 of the mobile terminal may be configured to perform communication with other electronic devices including another mobile terminal, a wireless communication system, and an external server and transmit/receive data signals to/from them. That is, the mobile terminal may transceive data with other electronics devices using one of the broadcast reception module 111, the mobile communication module 112, the wireless Internet module 113, and the short-range communication module 114 through the wireless communication unit 430. In addition, the wireless communication unit 420 can be implemented using wireless communication unit 110 of FIG. 1A.

According to one embodiment of the present invention, the wireless communication unit 430 may be configured to receive an event associated with the application installed in the mobile terminal from the outside.

The control unit 440 may be configured to perform data processing, control the above-mentioned individual units of the mobile terminal, and control data transmission/reception between the units. In the present invention, the control unit 440 can be implemented using the controller 180 of FIG. 1A.

As one embodiment of the present invention, operations performed by the mobile terminal may be controlled by the control unit 440. However, for convenience of description, a description will be given on the assumption that such operations are performed/controlled by the mobile terminal.

In general, a video content is made based on the 16:9 screen ratio and a mobile terminal for displaying such a video content is also made based on the 16:9 screen ratio. However, in this case, in order for the mobile terminal to display a controller for controlling a video while playing the video back through a full screen, the controller must be overlaid with the video.

However, since the mobile terminal with the 18:9 screen ratio according to one embodiment of the present invention has its top/bottom or left/right area as a spare area while performing playback of a video with the 16:9 screen ratio, the mobile terminal can display a controller for controlling the video on its side area. Therefore, while watching the video, a user can use the controller without overlap between the played video and the controller.

Hereinafter, various embodiments for displaying the controller on the side area without interrupting the user from watching the video are described.

Embodiment for Displaying Controller

The mobile terminal according to one embodiment of the present invention can display at least one object on a side area when sensing an input signal for selecting one of a center area and the side area. Specifically, FIG. 5 illustrates that the mobile terminal displays a controller for controlling a video on the side area when sensing an input signal for selecting the center area, and FIG. 6 illustrates that the mobile terminal displays a controller for controlling a system when sensing an input signal for selecting the side area.

Figure 5:
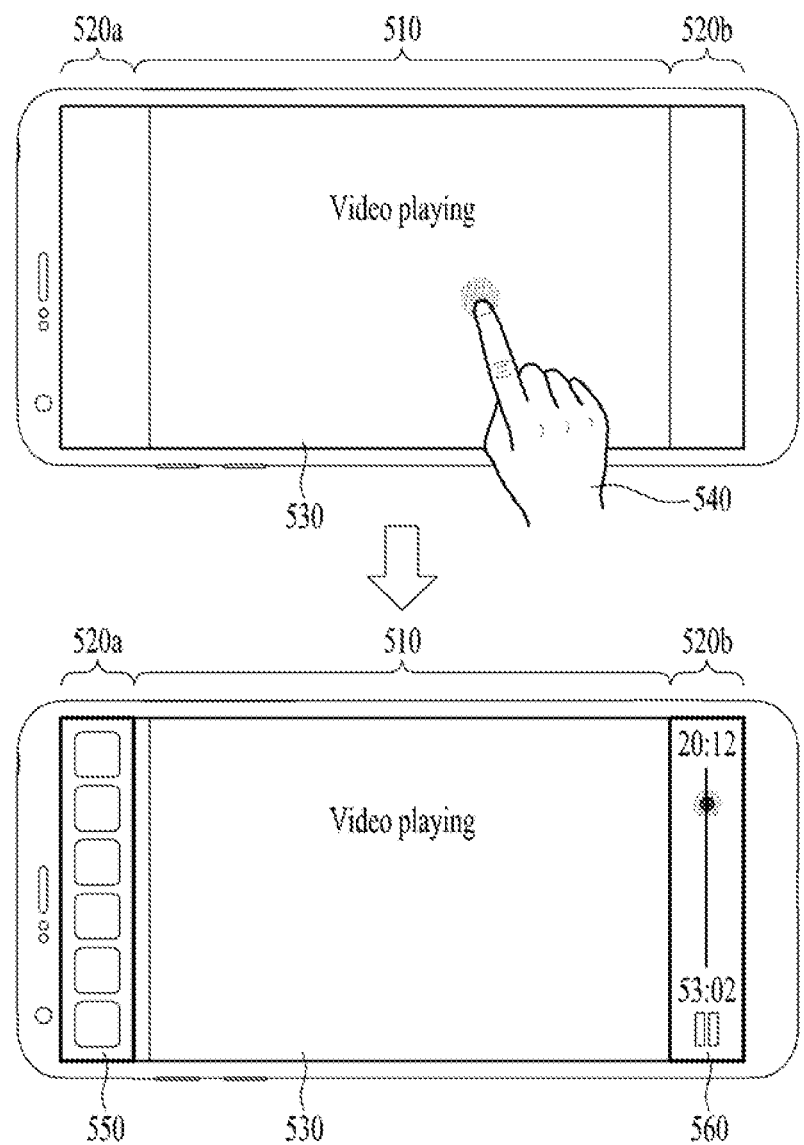
FIG. 5 is a diagram illustrating an embodiment of displaying a controller for controlling a video on the mobile terminal according to one embodiment of the present invention.
Figure 6:
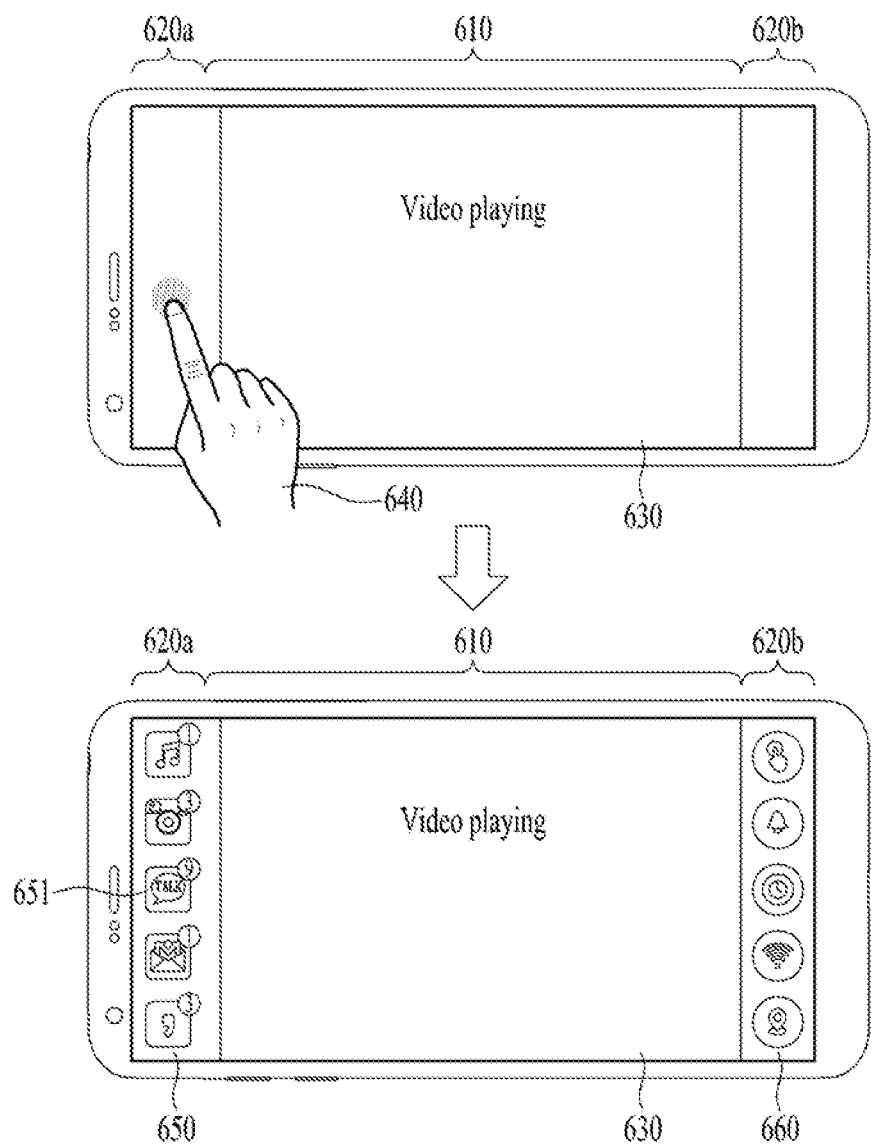
FIG. 6 is a diagram illustrating an embodiment of displaying a controller for controlling a system on the mobile terminal according to one embodiment of the present invention.

FIG. 5 is a diagram illustrating an embodiment of displaying the controller for controlling the video on the mobile terminal according to one embodiment of the present invention. To avoid redundant description, the features already mentioned in FIG. 4 are omitted in the embodiment of FIG. 5.

Referring to the first drawing of FIG. 5, the mobile terminal can display a content 530 on a center area 510 of a touch screen. In this case, the content 530 may correspond to a video playback application. That is, the mobile terminal may be in a state in which the video playback application 530 is launched on the center area 510 of the touch screen. In this case, the video playback application 530 executed on the center area 510 of the touch screen may be performing playback of a video file or stop the playback of the video file.

Hereinafter, a description will be given on the assumption that the video playback application 530 executed in the mobile terminal is playing back the video file.

According one embodiment of the present invention, the mobile terminal may sense a first input signal 540 for selecting the center area 510 while performing playback of the video file on the center area 510 of the touch screen. In this case, the first input signal 540 may correspond to a touch input signal for selecting a random point in the center area 510. For instance, a user may select the played video.

Referring to the second drawing of FIG. 5, the mobile terminal can display at least one object on side areas 520a and 520b of the touch screen after sensing the first input signal 540. In this case, the side areas 520a and 520b may include the first area 520a and the second area 520b. In addition, the at least one object may include a thumbnail, a controller, an icon, an indicator, etc.

According to one embodiment of the present invention, before sensing the first input signal 540, the mobile terminal may maintain states of the side areas 520a and 520b as an inactive state. In this case, the inactive state may mean that nothing is displayed, a black screen is displayed or the screen is off.

Although the embodiment of FIG. 5 illustrates that the first area 520a corresponds to the left one of the side areas 520a and 520b and the second area 520b corresponds to the right one of the side areas 520a and 520b, it is apparent that the left and right areas can be interchanged.

In addition, although the embodiment of FIG. 5 illustrates that since the mobile terminal is used in landscape mode, the side areas 520a and 520b are located at the right and left portions of the mobile terminal, it is apparent that when the mobile terminal is used in portrait mode, the side areas 520a and 520b are located at the top and bottom portions of the mobile terminal.

According to one embodiment of the present invention, the mobile terminal may display a preview thumbnail 550 of the content 530 displayed on the center area 510 on the first area 520a. In this case, the preview thumbnail 550 may include at least one of preview thumbnails of the currently displayed video file.

For example, if a total playback time of the played video file is 50 minutes, the mobile terminal may extract a preview thumbnail from the video file at each predetermined period (e.g., every 10 minutes) and then display the extracted preview thumbnail on the first area 520a. In addition, if the user selects a first preview thumbnail (not shown in the drawing), the mobile terminal may display a playback section corresponding to the first preview thumbnail on the center area 510.

According to one embodiment of the present invention, the mobile terminal may display a controller 560 for controlling the content 530 currently displayed on the center area 510 on the second area 520b. In this case, the controller 560 may be a controller for controlling the displayed video playback application 530. For example, the controller 560 may include a play button, a stop button, a fast-forward button, a rewind button, a timeline bar, etc.

Although not shown in the drawing, if the user selects the stop button included in the controller 560, the mobile terminal may stop the playback of the video displayed on the center area 510.

Although the embodiment of FIG. 5 illustrates that the preview thumbnail 550 is displayed on the first area 520a and the controller 560 is displayed on the second area 520b, it is apparent that the controller 560 can be displayed on the first area 520a and the preview thumbnail 550 can be displayed on the second area 520b. Such a configuration can be determined not only as a default value of the mobile terminal but also by the user.

Therefore, the mobile terminal can display the preview thumbnail 550 and the controller 560 on the side areas 520a and 520b according to an input signal of touching the center area 510 so that the user can watch the video displayed on the center area 510 and use the preview thumbnail 550 and the controller 560 without any interruption.

FIG. 6 is a diagram illustrating an embodiment of displaying the controller for controlling the system on the mobile terminal according to one embodiment of the present invention. To avoid redundant description, the features already mentioned in FIGS. 4 and 5 are omitted in the embodiment of FIG. 6.

Referring to the first drawing of FIG. 6, the mobile terminal can execute a video playback application 630 on a center area 610 of the touch screen. According one embodiment of the present invention, the mobile terminal may sense a first input signal 640 for selecting side areas 620a and 620b while performing playback of a video through the video playback application 630. In this case, the first input signal 640 may correspond to a touch input signal for selecting one of the side areas 620a and 620b. For example, a user may select the first area 620a.

Referring to the second drawing of FIG. 6, the mobile terminal can display at least one object on the side areas 620a and 620b of the touch screen after sensing the first input signal 640.

According to one embodiment of the present invention, the mobile terminal may display at least one icon 650 on the first area 620a. In this case, the at least one icon 650 may be an indicator indicating an application or an indicator for executing an application. For instance, the mobile terminal may display a first icon 651 on the first area 620*a*.

According to one embodiment of the present invention, when receiving an event associated with the at least one icon 650 displayed on the first area 620*a*, the mobile terminal may display a notification badge on the at least one icon 650. Here, the notification badge may correspond to a numeral indicator indicating the number of received events.

In detail, the application corresponding to the at least one icon 650 displayed on the first area 620*a* may generate notification at the mobile terminal. For example, a music application, a camera application, a messenger application, an SMS application, a mail application and the like may receive events from an external device or server.

In other words, when receiving the event associated with the application through the wireless communication unit, the mobile terminal may display the notification badge on the at least one icon 650 corresponding to the application. For example, when receiving an event associated with an application corresponding to the first icon 651, the mobile terminal may display the notification badge on the first icon 651. Thus, the user is able to know that the event associated with the first icon 651 is received.

According to one embodiment of the present invention, the mobile terminal may display a controller 660 on the second area 620*b*. In this case, the controller 660 may be the controller for controlling the system of the mobile terminal. More specifically, the controller 660 may include various configuration buttons for controlling the system of the mobile terminal. For example, the controller 660 may include an airplane mode button, a Wi-Fi button, a Bluetooth button, a vibration button, etc.

Although the embodiment of FIG. 6 illustrates that the at least one icon 650 is displayed on the first area 620*a* and the controller 660 is displayed on the second area 620*b*, it is apparent that the controller 660 can be displayed on the first area 620*a* and the at least one icon 650 can be displayed on the second area 620*b*.

According to the embodiments of FIGS. 5 and 6, while watching the video displayed on the center area 510/610, the user can select one of the center area 510/610 and the side areas 520*a*/620*a* and 520*b*/620*b* without any interruption to control either of the displayed video or the mobile terminal.

In detail, if the mobile terminal senses a signal for selecting the center area 510/610 from the user, the mobile terminal may recognize that the user intends to control the video displayed on the center area 510/610. Thus, the mobile terminal may display at least one of the preview thumbnail 550 of the video displayed on the center area 510/610 and the controller 560 for controlling the video.

On the other hand, if the mobile terminal senses a signal for selecting the side areas 520*a*/620*a* and 520*b*/620*b*, the mobile terminal may recognize that the user intends to control the mobile terminal without any interruption while watching the video displayed on the center area 510/610. Thus, the mobile terminal may display at least one of the at least one icon 650 including the notification badge and the controller 660 for controlling the system.

Figure 7:
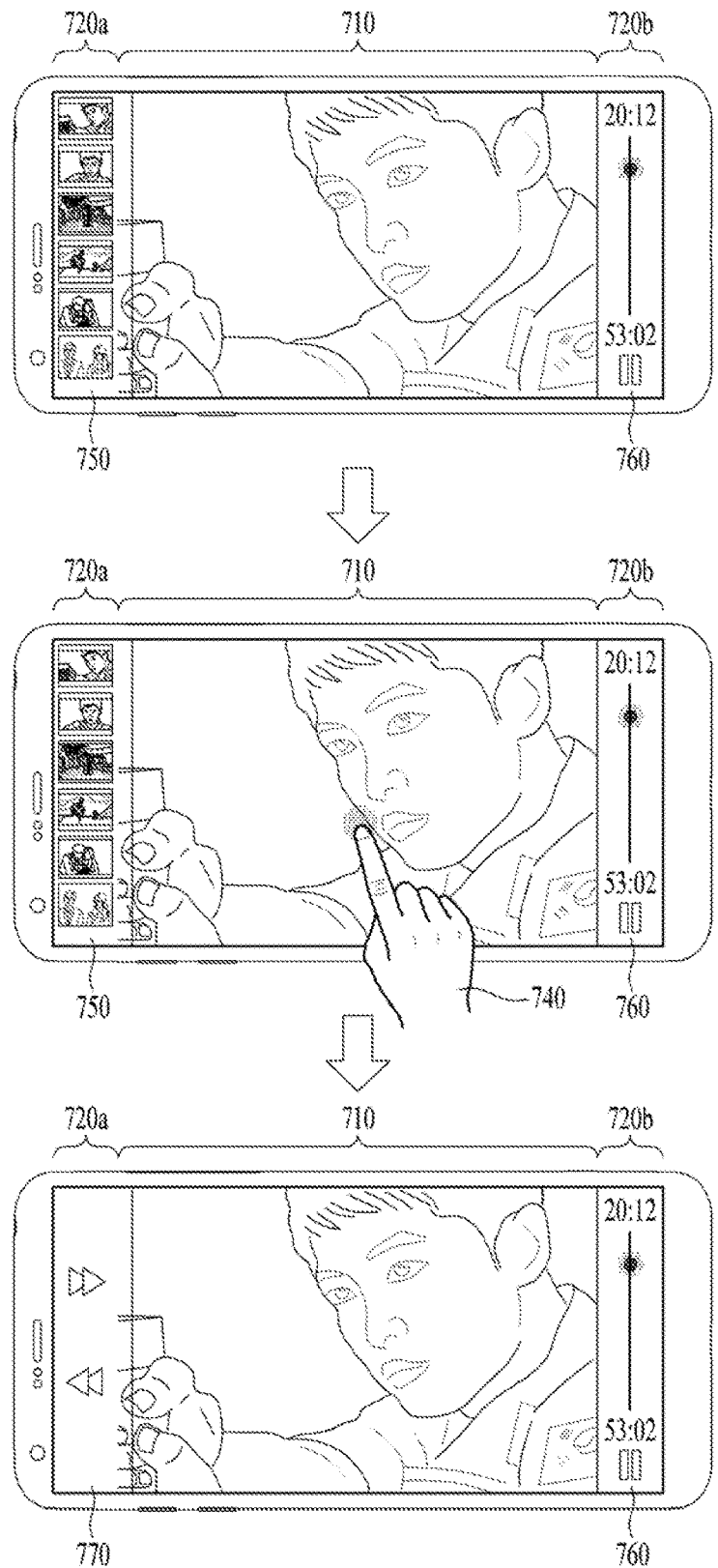
FIG. 7 is a diagram illustrating an embodiment of displaying another controller for controlling a video on the mobile terminal according to one embodiment of the present invention.

FIG. 7 is a diagram illustrating an embodiment of displaying another controller for controlling a video on the mobile terminal according to one embodiment of the present invention. To avoid redundant description, the features already mentioned in FIGS. 4 to 6 shall be omitted in the embodiment of FIG. 7.

The first drawing of FIG. 7 may correspond to the second drawing of FIG. 5. That is, referring to the first drawing of FIG. 7, the mobile terminal can display a preview thumbnail 750 and a first controller 760 on side areas 720*a* and 720*b* while performing playback of a video on a center area 710. In this case, the first controller 760 may correspond to a controller for controlling the video displayed on the center area 710.

Referring to the second drawing of FIG. 7, the mobile terminal can sense a first input signal 740 for selecting the center area 710. In this case, the first input signal 740 may be an input signal inputted from a user by touching a random point of the center area 710 where the video is displayed according to a predetermined manner. For example, the user may touch the center area 710 where the video is displayed with predetermined pressure.

In addition, unlike the second drawing of FIG. 5, the second drawing of FIG. 7 shows a case in which at least one of the preview thumbnail 750 and the first controller 760 is displayed on the side area 720*a* and 720*b*.

Referring to the third drawing of FIG. 7, after sensing the first input signal 740, the mobile terminal may stop display of the preview thumbnail 750 on the first area 720*a* and then display a second controller 770 on the first area 720*a*. In this case, the second controller 770 may correspond to another controller for controlling the video displayed on the center area 710. For example, the second controller 770 may include a fast-forward button, a rewind button, a button for retrieving a previous video, a button for retrieving a next video, and the like.

In detail, in the embodiment of FIG. 7, the mobile terminal may display the first controller 760 for controlling the video displayed on the center area 710. In this case, the first controller 760 may include basic control buttons for video control. For example, the first controller 760 may include a playback/stop button and a timeline bar.

According to one embodiment of the present invention, after sensing the first input signal 740, the mobile terminal may simultaneously display the first controller 760 and the second controller 770, which controls the video in a different way as that of the first controller 760. For instance, the first controller 760 may include the playback/stop button and the timeline bar only, the second controller 770, whereas the second controller 770 may include the fast-forward button and the rewind button.

Therefore, when the user cannot completely control the video using the first controller 760 only, the user may input the first input signal by touching the random point of the center area 710 and then control the video through the second controller 770 displayed on the first area 720*a*.

Figure 8:
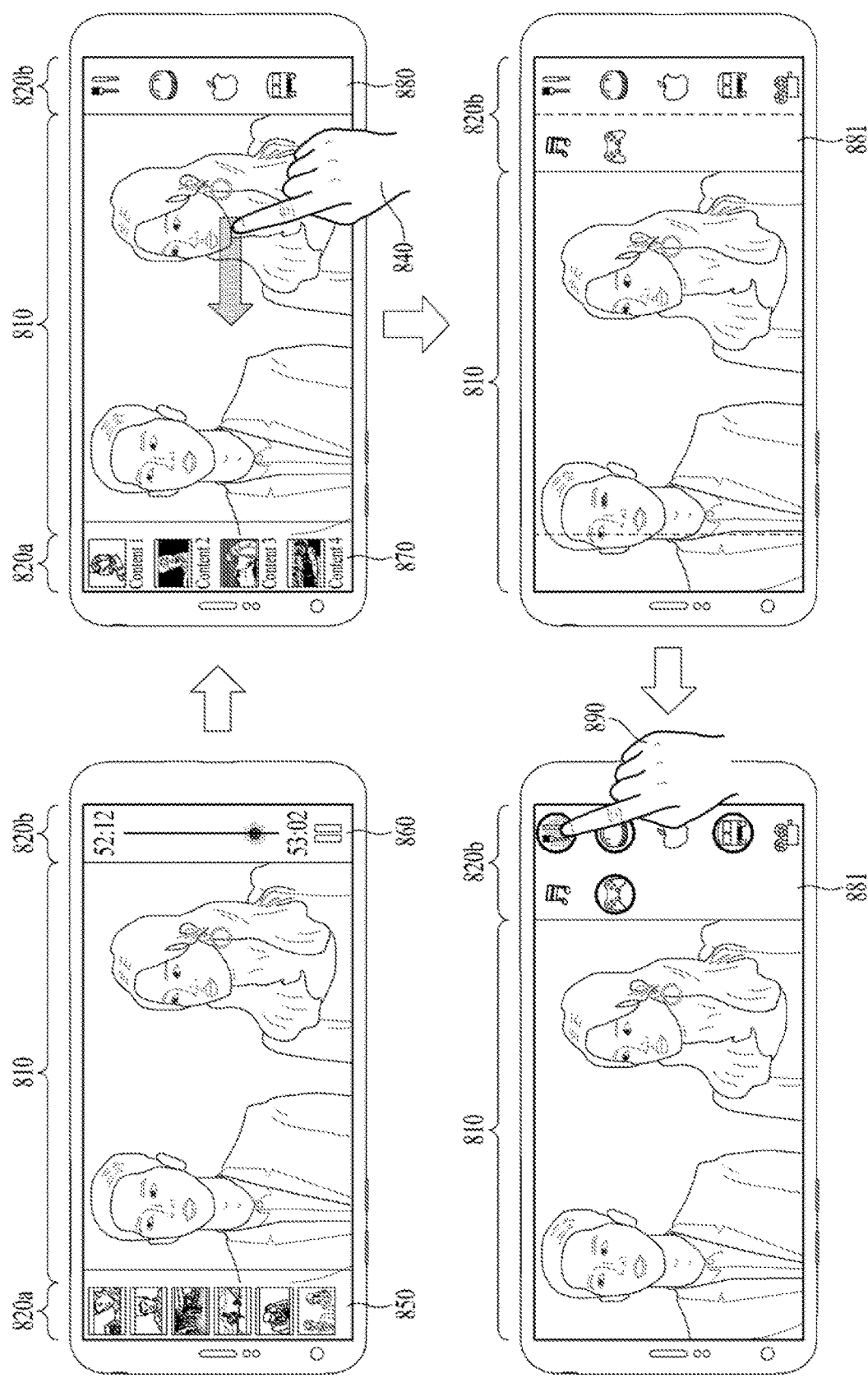
FIG. 8 is a diagram illustrating an embodiment of displaying an object in different ways based on input signals on the mobile terminal according to one embodiment of the present invention.

FIG. 8 is a diagram illustrating an embodiment of displaying an object in different ways based on input signals on the mobile terminal according to one embodiment of the present invention. To avoid redundant description, the features already mentioned in FIGS. 4 to 7 shall be omitted in the embodiment of FIG. 8.

The first drawing of FIG. 8 may correspond to the second drawing of FIG. 5. That is, referring to the first drawing of FIG. 8, the mobile terminal can display a preview thumbnail 850 and a controller 860 on side areas 820*a* and 820*b* while performing playback of a video on a center area 810.

Referring to the second drawing of FIG. 8, if a remaining playback time of the video displayed on the center area 810 is equal to or smaller than a predetermined time, the mobile terminal may stop display of the preview thumbnail 850 on the first area 820*a* and then output a first recommended video list 870 through the first area 820*a*. In this case, the first recommended video list 870 may include at least one video thumbnail. For instance, the first recommended video list 870 may include a first video thumbnail, a second video thumbnail, and a third video thumbnail.

For example, if a total playback time of the video played by the mobile terminal is 53 minutes and 2 seconds and the current playback time is 52 minutes and 12 seconds, the mobile terminal may determine that the remaining playback time of the played video is less than 1 minute. Thereafter, the mobile terminal may stop the display of the preview thumbnail 850 on the first area 820*a* and then output the first recommended video list 870 through the first area 820*a*.

In addition, although not shown in the drawing, when the mobile terminal senses an input signal for selecting the first video thumbnail included in the first recommended video list 870, the mobile terminal may display a first video on the center area 810. Details will be described later with reference to FIG. 11.

According to one embodiment of the present invention, when the remaining playback time of the video displayed on the center area 810 is equal to or less than the predetermined time, the mobile terminal may stop display of the controller 860 on the second area 820*b* and then output a first video category list 880 through the second area 820*b*. In this case, the first video category list 880 may include icons corresponding to one or more video categories. For example, the first video category list 880 may contain four video categories.

According to one embodiment of the present invention, the mobile terminal may sense a first input signal 840 corresponding to a touch-drag in a first direction on the touch screen. In this case, the first direction may be a direction from the second area 820*b* to the first area 820*a*. In the embodiment of FIG. 8, the first direction may be a direction from the right to the left.

In addition, the first input signal 840 may be sensed on both of the center area 810 and the side area 820*a* and 820*b*. Moreover, the first input signal 840 may include a touch input signal corresponding to a flick or swipe in the first direction. That is, the first input signal 840 may include all touch input signals in the first direction.

Referring to the third drawing of FIG. 8, based on the first input signal 840, the mobile terminal can eliminate the first area 820*a* on the touch screen and enlarge the second area 820*b*. In detail, since the mobile terminal according to one embodiment of the present invention has the touch screen with the screen ratio (18:9) greater than the conventional screen ratio (16:9), the mobile terminal may partition the touch screen into the first area 820*a*, the center area 810, and the second area 820*b* at a ratio of 1:16:1 before sensing the first input signal 840. In addition, the above ratio is merely one example and it is apparent that the touch screen can be partitioned at a different ratio.

When sensing the first input signal 840, the mobile terminal may partition the touch screen into the center area 810 and the second area 820*b* at a ratio of 16:2. That is, by inputting the touch input signal corresponding to the touch-drag from the right to the left, a user may visually check that the first area 820*a* located at the left side is eliminated and the second area 820*b* located at the right side is enlarged.

In addition, according to one embodiment of the present invention, sizes of the first and second areas 820*a* and 820*b* may be gradually changed.

According to one embodiment of the present invention, the mobile terminal may output a second video category list 881 through the enlarged second area 820*b*. In this case, the second video category list 881 may include more video categories than the first video category list 880. For instance, the second video category list 881 may include seven video categories.

According to one embodiment of the present invention, the mobile terminal may adjust the number of objects based on a drag (flick or swipe) distance of the first input signal 840. That is, in the embodiment of FIG. 8, the mobile terminal may adjust the number of video categories included in the second video category list 881 outputted through the second area 820*b* based on the drag distance of the first input signal 840.

For example, if the first input signal 840 is dragged for a first distance, the mobile terminal may display the second video category list 881 containing seven video categories on the second area 820*b*. On the other hand, if the first input signal 840 is dragged for a second distance longer than the first distance, the mobile terminal may display the second video category list 881 containing nine video categories on the second area 820*b*.

Referring to the fourth drawing of FIG. 8, the mobile terminal can sense a second input signal 890 for selecting at least one video category in the second video category list 881. In detail, the mobile terminal may display the second video category list 881 on the second area 820*b*, which is enlarged by the size of the first area 820*a*. In this case, the user may select at least one desired video category in the displayed second video category list 881.

According to one embodiment of the present invention, the mobile terminal may display the video category selected based on the second input signal 890 using a different color, whereby the user can identify the selected video category.

Hereinafter, procedures after sensing the second input signal 890 are described with reference to FIG. 9.

Figure 9:
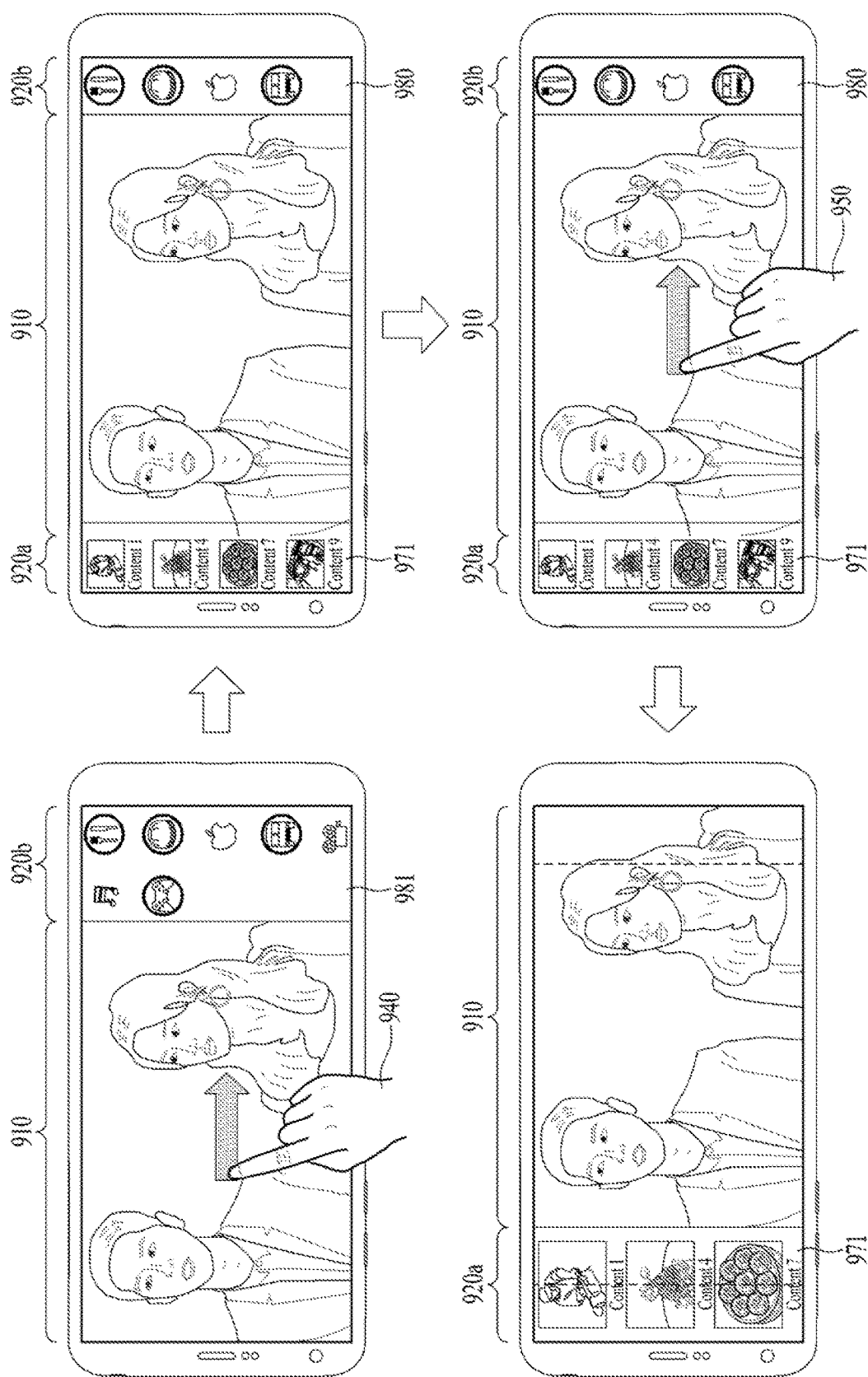
FIG. 9 is a diagram illustrating another embodiment of displaying an object in different ways based on input signals on the mobile terminal according to one embodiment of the present invention.

FIG. 9 is a diagram illustrating another embodiment of displaying an object in different ways based on input signals on the mobile terminal according to one embodiment of the present invention. To avoid redundant description, the features already mentioned in FIGS. 4 to 8 shall be omitted in the embodiment of FIG. 9.

The first drawing of FIG. 9 shows a state obtained by performing the processes described in the fourth drawing of FIG. 8. Referring to first drawing of FIG. 9, the mobile terminal can display a second video category list 981 on a second area 920*b*.

According to one embodiment of the present invention, the mobile terminal may sense a first input signal 940 corresponding to a touch-drag in a first direction on the touch screen. In the embodiment of FIG. 9, the first direction may be a direction from the left to the right.

Referring to the second drawing of FIG. 9, after sensing the first input signal 940, the mobile terminal may display a second recommended video list 971 on a first area 920*a*. In this case, the second recommended video list 971 may include video thumbnails belonging to the video category selected in the embodiment of FIG. 8. That is, since the second recommended video list 971 is created based on the video category selected in the embodiment of FIG. 8, the second recommended video list 971 may be different from the first recommended video list 870. For instance, the second recommended video list 971 may include a first video thumbnail, a fourth video thumbnail, and a seventh video thumbnail.

According to one embodiment of the present invention, after sensing the first input signal 940, the mobile terminal may display the second recommended video list 971 on the first area 920*a*. At the same time, the mobile terminal may stop display of the second video category list 981 on the second area 920b and then display a first video category list 980 thereon.

In addition, according to one embodiment of the present invention, when displaying the first video category list 980, the mobile terminal may display the video category selected in the embodiment of FIG. 8 with a different color, whereby a user may identify the selected video category.

That is, by inputting the touch input signal corresponding to the touch-drag from the left to the right, the user may visually check that the first area 920a located at the left side is updated and the second area 820b located at the right side is reduced.

Referring to the third drawing of FIG. 9, the mobile terminal can sense a second input signal 950 corresponding to a touch-drag in a second direction on the touch screen. In the embodiment of FIG. 9, the second direction may be identical to the first direction. In other words, the second direction may be the direction from the left to the right.

Referring to the fourth drawing of FIG. 9, after sensing the second input signal 950, the mobile terminal may enlarge the first area 920a and eliminate the second area 920b. In detail, the mobile terminal may partition the touch screen into the first area 920a, a center area 910, and the second area 920b at the ratio of 1:16:1 before sensing the second input signal 950.

When sensing the second input signal 950, the mobile terminal may partition the touch screen into the first area 920a and the center area 910 at a ratio of 2:16. That is, since the input signal direction is changed compared to that in the embodiment of FIG. 8, the mobile terminal may enlarge the first area 920a and eliminate the second area 920b on the touch screen.

According to one embodiment of the present invention, when the first area 920a is enlarged according to the second input signal 950, the mobile terminal may also enlarge the second recommended video list 971 displayed on the first area 920a. In other words, the mobile terminal may adjust sizes of characters and thumbnails in the second recommended video list 971 on the basis of the size of the first area 920a.

Figure 10:
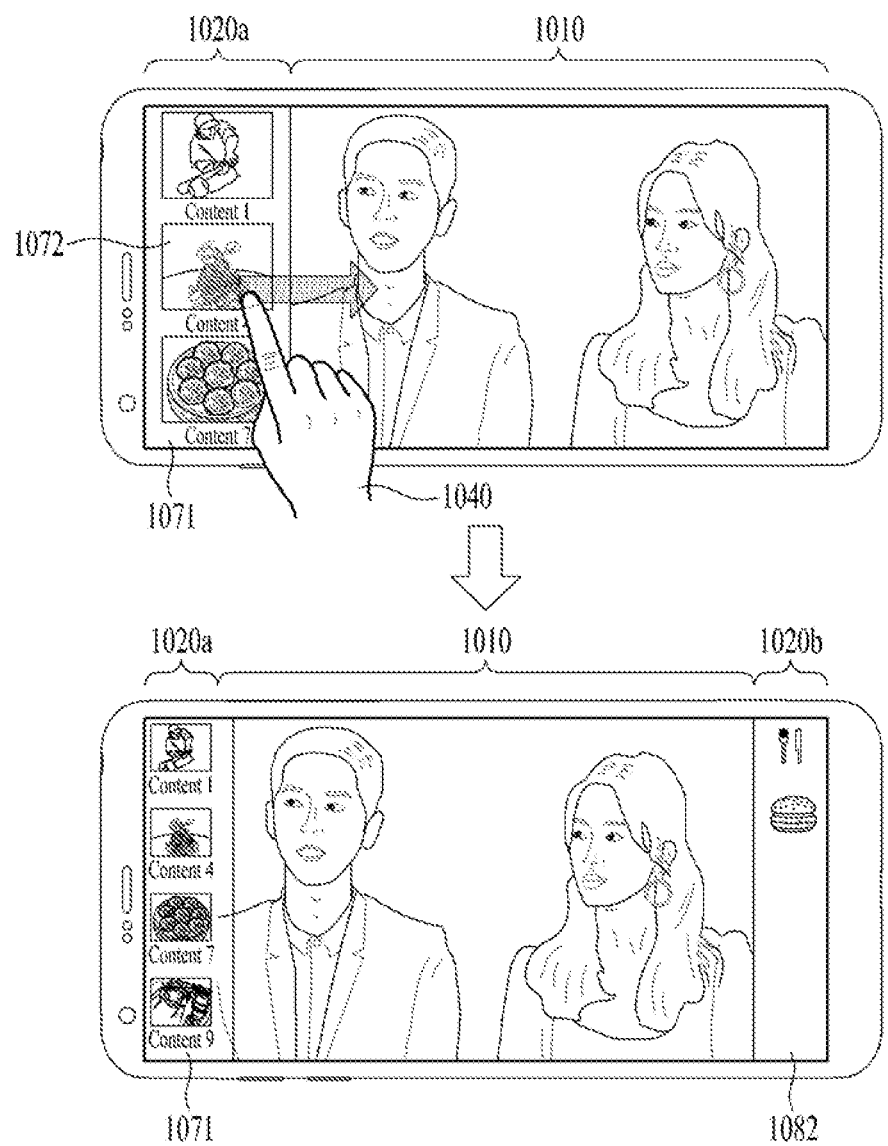
FIG. 10 is a diagram illustrating a further embodiment of displaying an object in different ways based on input signals on the mobile terminal according to one embodiment of the present invention.

FIG. 10 is a diagram illustrating a further embodiment of displaying an object in different ways based on input signals on the mobile terminal according to one embodiment of the present invention. To avoid redundant description, the features already mentioned in FIGS. 4 to 9 shall be omitted in the embodiment of FIG. 10.

The first drawing of FIG. 10 may correspond to the fourth drawing of FIG. 9. That is, the mobile terminal may partition the touch screen into a first area 1020a and a center area 1010 at the ratio of 2:16. In addition, the mobile terminal may display a second recommended video list 1071 on the first area 1020a and playback a video on the center area 1010.

According to one embodiment of the present invention, the mobile terminal may sense a first input signal 1040 for selecting a first video thumbnail 1072 included in the second recommended video list 1071. In this case, the first input signal 1040 may be a touch input signal of touching the first video thumbnail 1072 and dragging it in a first direction. In this case, the first direction may be a direction from the left side where the first area 1020a is located to the right side where the center area 1010 is located.

Referring to the second drawing of FIG. 10, the mobile terminal may partition the touch screen into the first area 1020a, the center area 1010, and a second area 1020b at the ratio of 1:16:1 based on the first input signal 1040.

According to one embodiment of the present invention, the mobile terminal may display a third video category list 1082, which is created based on the first video thumbnail 1072, on the second area 1020b according to the first input signal 1040. In this case, the third video category list 1082 may be a video category containing the selected first video thumbnail 1072. For instance, if a category of the first video thumbnail 1072 is 'meal and beverage', the mobile terminal may display icons associated with meal and beverage through the third video category list 1082.

Therefore, to check the category associated with the first video thumbnail 1072, a user may select the first video thumbnail 1072 in the second recommended video list 1072 displayed on the first area 1020a. Thus, the user may check the third video category list 1082 created based on the first video thumbnail 1072 through the second area 1020b.

Moreover, although not shown in the drawing, when the user selects at least one video category included in the third video category list 1082, the recommended vide list displayed on the first area 1020a can also be changed. In other words, the embodiment of FIG. 10 can be applied together with the embodiment of FIG. 9.

Figure 11:
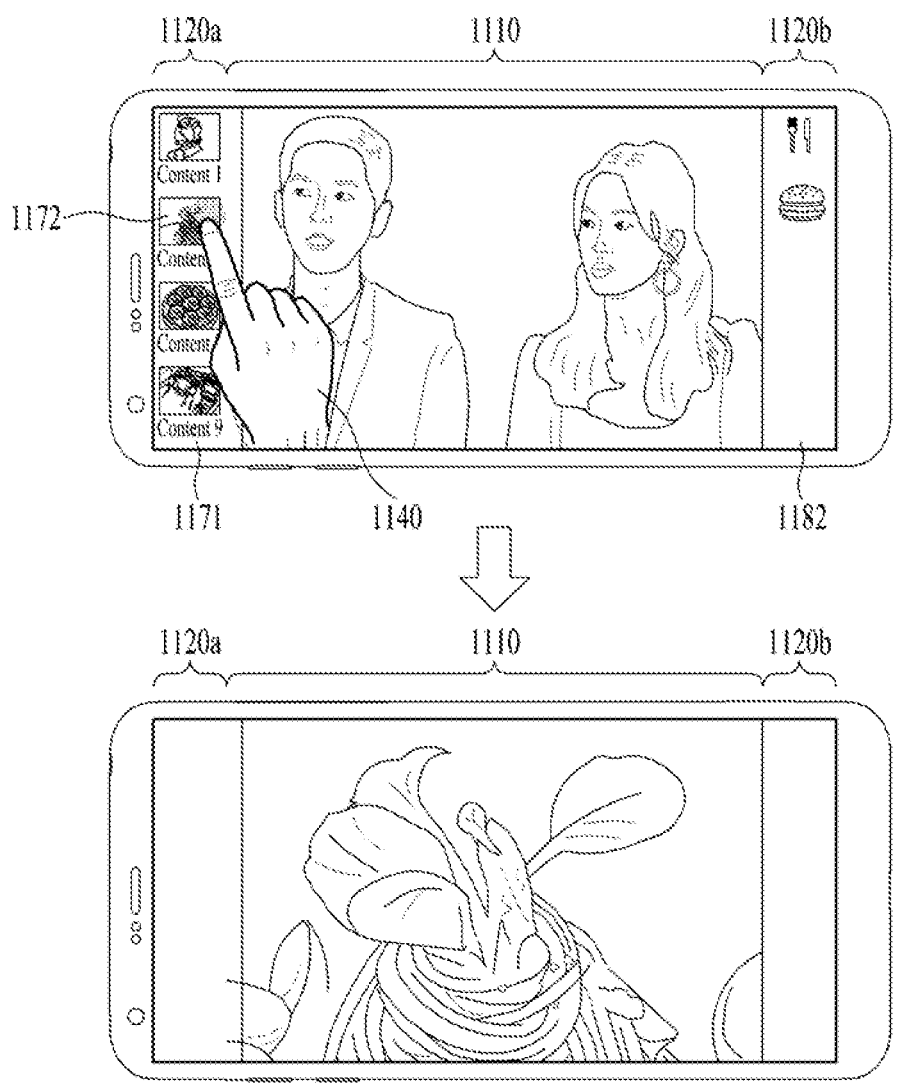
FIG. 11 is a diagram illustrating an embodiment of playing a video back on the mobile terminal according to one embodiment of the present invention.

FIG. 11 is a diagram illustrating an embodiment of playing a video back on the mobile terminal according to one embodiment of the present invention. To avoid redundant description, the features already mentioned in FIGS. 4 to 10 shall be omitted in the embodiment of FIG. 11.

The first drawing of FIG. 11 may correspond to the second drawing of FIG. 10. That is, the mobile terminal may display a second recommended video list 1171 on a first area 1120a, playback a video on a center area 1110, and display a third video category list 1182 on a second area 1120b.

According to one embodiment of the present invention, the mobile terminal may sense a first input signal 1140 for selecting a first video thumbnail 1172 included in the second recommended video list 1171. In this case, the first input signal 1140 may be an input signal of touching the first video thumbnail 1172.

Referring to the second drawing of FIG. 11, after sensing the first input signal 1140, the mobile terminal may playback a first video on the center area 1110. In this case, the first video may be a video corresponding to the first video thumbnail 1172. That is, when the mobile terminal senses a touch input with no direction unlike the embodiment in FIG. 10, the mobile terminal may display a video corresponding to the touch input on the center area 1110.

According to one embodiment of the present invention, after sensing the first input signal 1140, the mobile terminal may switch states of the first area 1120a and the second area 1120b to the inactive state and, at the same time, playback the first video on the center area 1110. That is, when sensing the first input signal 1140, the mobile terminal may recognize that a user intends to watch a video through the center area 1110 rather than control the video through the first area 1120a and the second area 1120b and thus playback the video on the center area 1110.

According to the embodiments of FIGS. 8 to 11, while performing playback of a video on the center area, the mobile terminal can control a size of each of the first, central, and second areas according to an input signal corresponding to a touch drag in a certain direction and change video playback controllers displayed on the first and second areas. The order of implementing the above-mentioned embodiments may be the same as the sequences described from FIG. 8 to FIG. 11. Alternatively, the order may be changed.

Figure 12:
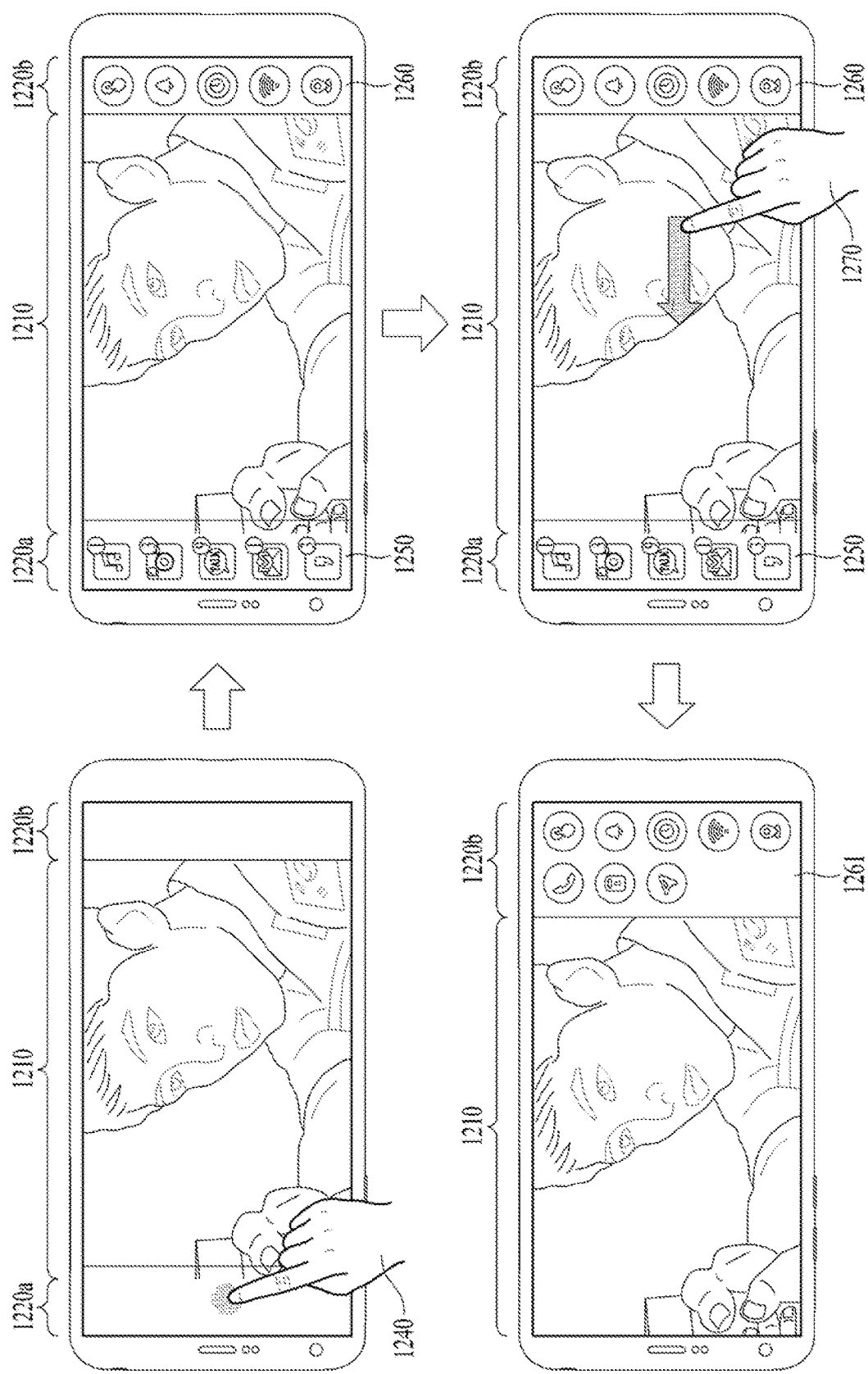
FIG. 12 is a diagram illustrating another embodiment of displaying a controller for controlling the system on the mobile terminal according to one embodiment of the present invention.

FIG. 12 is a diagram illustrating another embodiment of displaying a controller for controlling the system on the mobile terminal according to one embodiment of the present invention. To avoid redundant description, the features already mentioned in FIGS. 4 to 11 shall be omitted in the embodiment of FIG. 12.

Referring to the first drawing of FIG. 12, the mobile terminal may partition the touch screen into a first area 1220a, a center area 1210, and a second area 1220b at the ratio of 1:16:1. In this case, the mobile terminal may be displaying a video on the center area 1210. Details will be described as follows.

According one embodiment of the present invention, the mobile terminal may sense a first input signal 1240 for selecting one of the side areas 1220a and 1220b. For instance, the mobile terminal may sense the first input signal 1240 for selecting the first area 1220a.

Referring to the second drawing of FIG. 12, after sensing the first input signal 1240, the mobile terminal may display at least one icons 1250 on the first area 1220a and a first controller 1260 on the second area 1220b. In this case, the at least one icon 1250 may be an icon representing an application capable of receiving an event. In addition, the first controller 1260 may include various configuration buttons for controlling the system of the mobile terminal. For instance, the first controller 1260 may include 6 system configuration buttons.

Referring the third drawing of FIG. 12, the mobile terminal may sense a second input signal 1270 corresponding to a touch drag in a first direction on the touch screen. In this case, the first direction may be a direction from the second area 1220b to the first area 1220a. In the embodiment of FIG. 12, the first direction may be the direction from the right to the left. The details are the same as those described in FIG. 8.

Referring to the fourth drawing of FIG. 12, after sensing the second input signal 1270, the mobile terminal may stop display of the at least one icon 1250 on the first area 1220a and display a second controller 1261 on the second area 1220b.

In detail, after sensing the second input signal 1270, the mobile terminal may eliminate the first area 1220a and enlarge the second area 1220b. For instance, the mobile terminal may partition the touch screen into the center area 1210 and the second area 1220b at the ratio of 16:2.

According to one embodiment of the present invention, the mobile terminal may display the second controller 1261 on the enlarged second area 1220b. In this case, the second controller 1261 may include more system configuration buttons than the first controller 1260. For example, the second controller 1261 may include nine system configuration buttons.

When the mobile terminal senses an input signal from a user, which corresponds to a touch drag from the right to the left, the mobile terminal may enlarge the second area 1220b located at the right side and also increase the number of controllers displayed on the second area 1220b.

Similarly, when sensing the input signal from the user, which corresponds to the touch drag from the right to the left, the mobile terminal may stop display of the at least one icon 1250 located at the left side and move the center area 1210 where the video is displayed to the right by the width of the first area 1220a.

Figure 13:
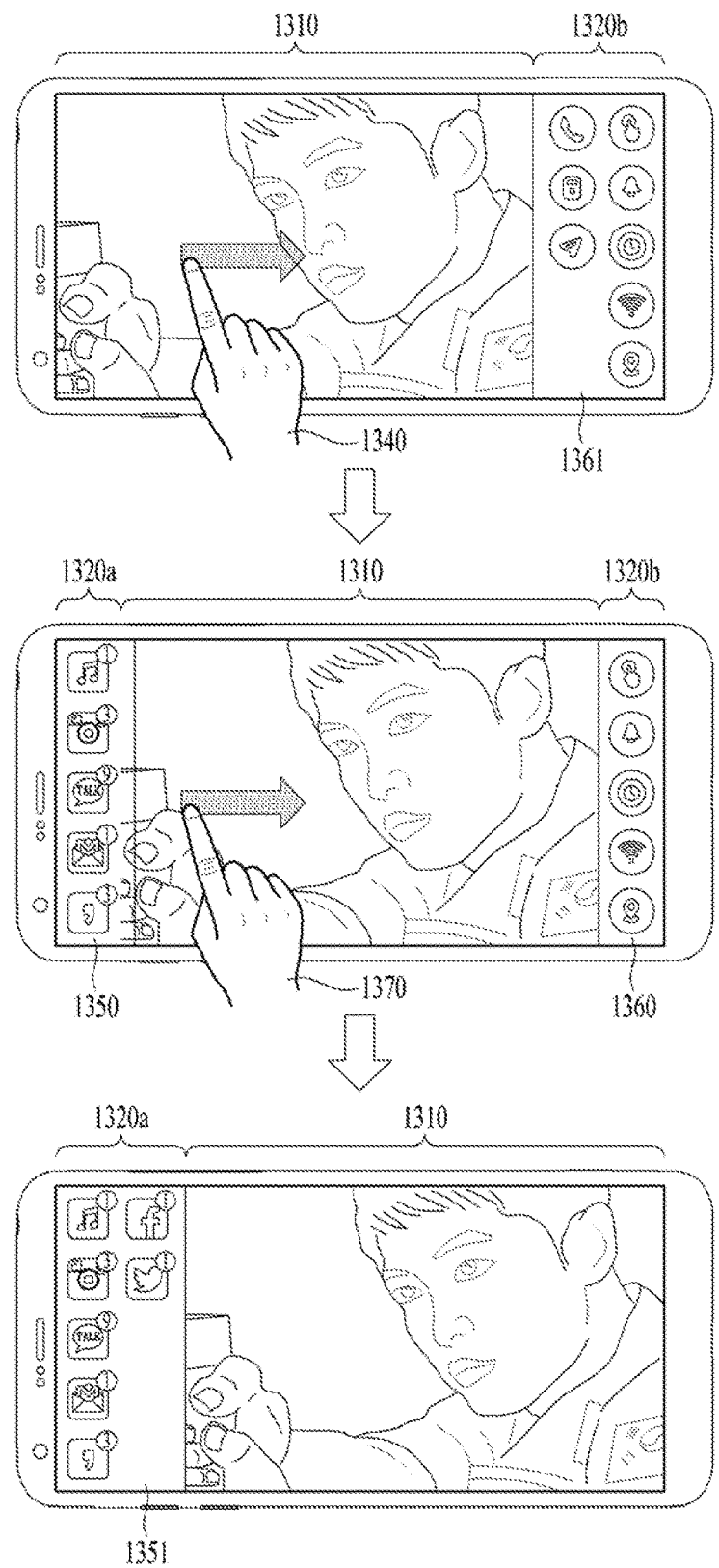
FIG. 13 is a diagram illustrating an embodiment of displaying detailed information of an icon on a first area of the mobile terminal according to one embodiment of the present invention.

FIG. 13 is a diagram illustrating an embodiment of displaying detailed information of an icon on a first area of the mobile terminal according to one embodiment of the present invention. To avoid redundant description, the features already mentioned in FIGS. 4 to 12 shall be omitted in the embodiment of FIG. 13.

The first drawing of the FIG. 13 may correspond to the fourth drawing of FIG. 12. That is, the mobile terminal may partition the touch screen into a center area 1310 and a second area 1320b at the ratio of 16:2. In addition, the mobile terminal may playback a video on the center area 1310 and display a second controller 1361 on the second area 1320b.

According to one embodiment of the present invention, the mobile terminal may sense a first input signal 1340 corresponding to a touch drag in a second direction. In this case, the second direction may be the direction from the left to the right. Details are the same as those described above.

Referring to the second drawing of FIG. 13, after sensing the first input signal 1340, the mobile terminal may display a first icon group 1350 on the first area 1320a and display a first controller 1360 on the second area 1320b. In this case, the first icon group 1350 may correspond to at least one icon described in the above embodiments. For example, the first icon group 1350 may include six icons each representing a single application.

According to one embodiment of the present invention, after sensing the first input signal 1340, the mobile terminal may partition the touch screen into the first area 1320a, the center area 1310, and a second area 1320b at the ratio of 1:16:1. In other words, the first and second drawings of FIG. 13 can be interpreted as that the processes shown in the third and fourth drawings of FIG. 12 are inversely performed.

That is, when sensing the input signal corresponding to the touch drag in the opposite direction as in FIG. 12, the mobile terminal can display the first area 1320a, which was eliminated. In addition, the mobile terminal may adjust a size of the enlarged second area 1320b to be equal to that of the first area 1320a. Since the size of the second area 1320b is reduced, the mobile terminal switches the second controller 1361 to the first controller 1360.

According to one embodiment of the present invention, when intending to the switch the second controller 1361 to the first controller 1360, the mobile terminal may output the first controller 1360 by gradually reducing the second controller 1361 instead of stopping display of the second controller 1361 and displaying the first controller 1360.

According to one embodiment of the present invention, the mobile terminal may sense a second input signal 1370. In this case, the second input signal 1370 may be sensed in the state where the touch screen is partitioned into the first area 1320a, the center area 1310, and a second area 1320b at the ratio of 1:16:1.

Referring to the third drawing of FIG. 13, after sensing the second input signal 1370, the mobile terminal may stop display of the first controller 1360 on the second area 1320b and output a second icon group 1351 through the first area 1320a. In this case, the second icon group 1351 may include more icons than the first icon group 1350. For example, the second icon group 1351 may include seven icons each representing an application.

In other words, when the mobile terminal senses an input signal from a user, which corresponds to a touch drag from the left to the right, the mobile terminal may enlarge the first area 1320a located at the left side and also increase the number of icons displayed on the first area 1320a.

Similarly, when sensing the input signal from the user, which corresponds to the touch drag from the left to the right, the mobile terminal may stop display of the controller 1360 located at the right side and move the center area 1310 where the video is displayed to the right by the width of the first area 1320b.

Figure 14:
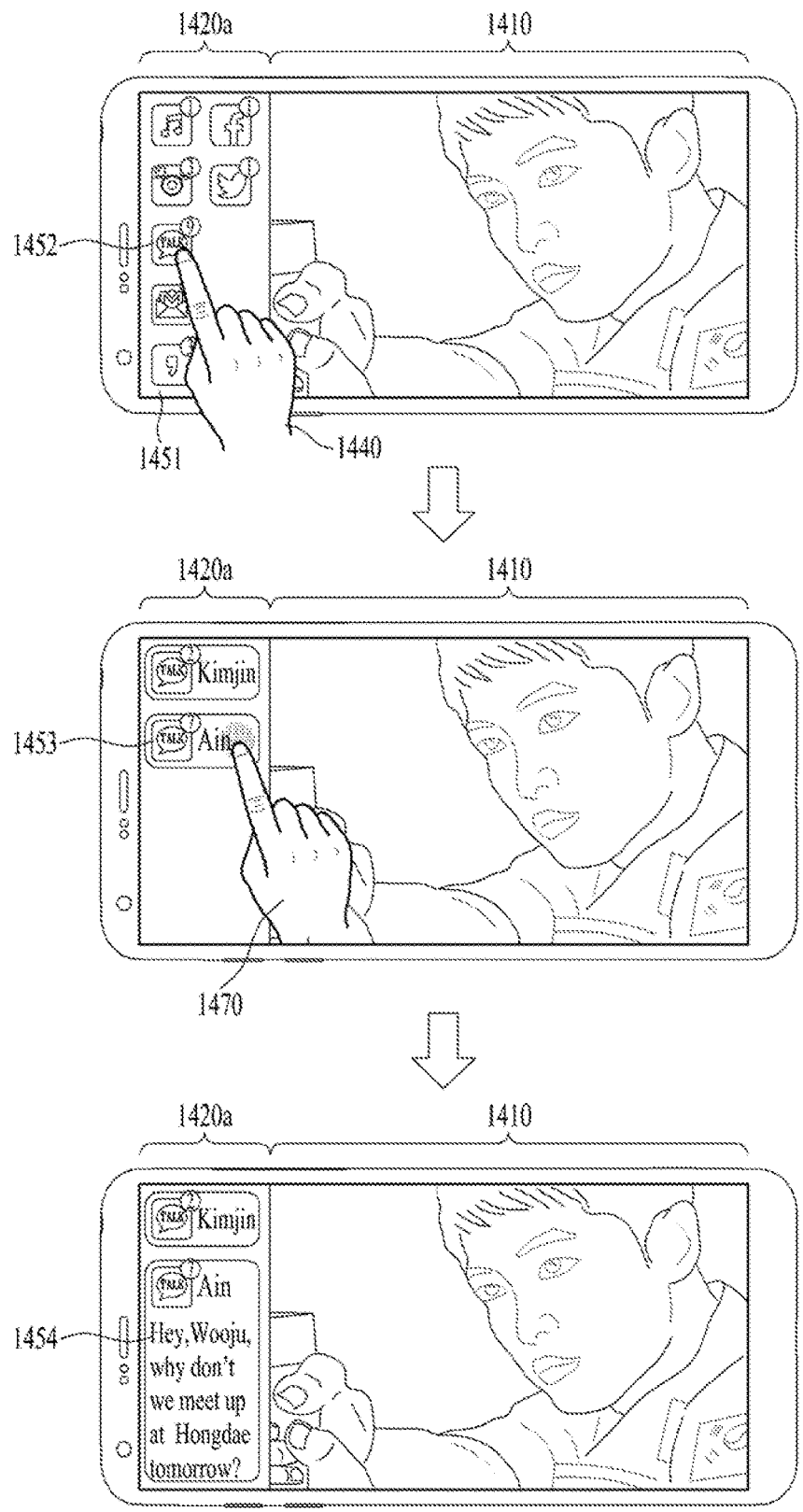
FIG. 14 is a diagram illustrating another embodiment of displaying detailed information of an icon on a first area of the mobile terminal according to one embodiment of the present invention.

FIG. 14 is a diagram illustrating another embodiment of displaying detailed information of an icon on a first area of the mobile terminal according to one embodiment of the present invention. To avoid redundant description, the features already mentioned in FIGS. 4 to 13 shall be omitted in the embodiment of FIG. 14.

The first drawing of FIG. 14 may correspond to the third drawing of FIG. 13. That is, the mobile terminal may display a second icon group 1451 on a first area 1420a and playback a video on a center area 1410.

According to one embodiment of the present invention, the mobile terminal may sense a first input signal 1440 for selecting a first icon 1452 included in the second icon group 1451. In this case, the first input signal 1440 may be an input signal of touching the first icon 1452. In addition, an application corresponding to the first icon 1452 may be outputting a notification badge through the first icon 1452 after receiving an event from the outside.

Referring to the second drawing of FIG. 14, after sensing the first input signal 1440, the mobile terminal may output first detailed information 1453 of the first icon 1452 through the first area 1420a. In this case, the first detailed information 1453 of the first icon 1452 may include brief information of the application corresponding to the first icon 1452. In addition, the mobile terminal may output a plurality of pieces of the first detailed information 1453 through the first area 1420a.

For instance, if the application corresponding to the first icon 1452 is a messenger application, the first detailed information 1453 of the first icon 1452 may include information on a sender of the received event. In this case, the mobile terminal may display a plurality of senders in order of receiving events.

That is, after sensing the first input signal 1440, the mobile terminal may stop display of the second icon group 1451 on the first area 1420a and, at the same time, display the first detailed information 1453 of the first icon 1452.

According one embodiment of the present invention, the mobile terminal may sense a second input signal 1470 for selecting the first detailed information 1453 of the first icon 1452. In this case, the second input signal 1470 may be an input signal of touching one of the event senders displayed on the first area 1420a.

Referring to the third drawing of FIG. 14, after sensing the second input signal 1470, the mobile terminal may output second detailed information 1454 through the first area 1420a. In this case, the second detailed information 1454 may include sub-information of the first detailed information 1453 selected by the second input signal 1470. For instance, when the first detailed information 1453 of the first icon 1452 indicates the sender of the received event, the second detailed information 1454 may include the contents of a message sent from the sender.

Therefore, a user may check the received message on the side area 1420a while watching the video played on the center area 1410 without any interruption.

Figure 15:
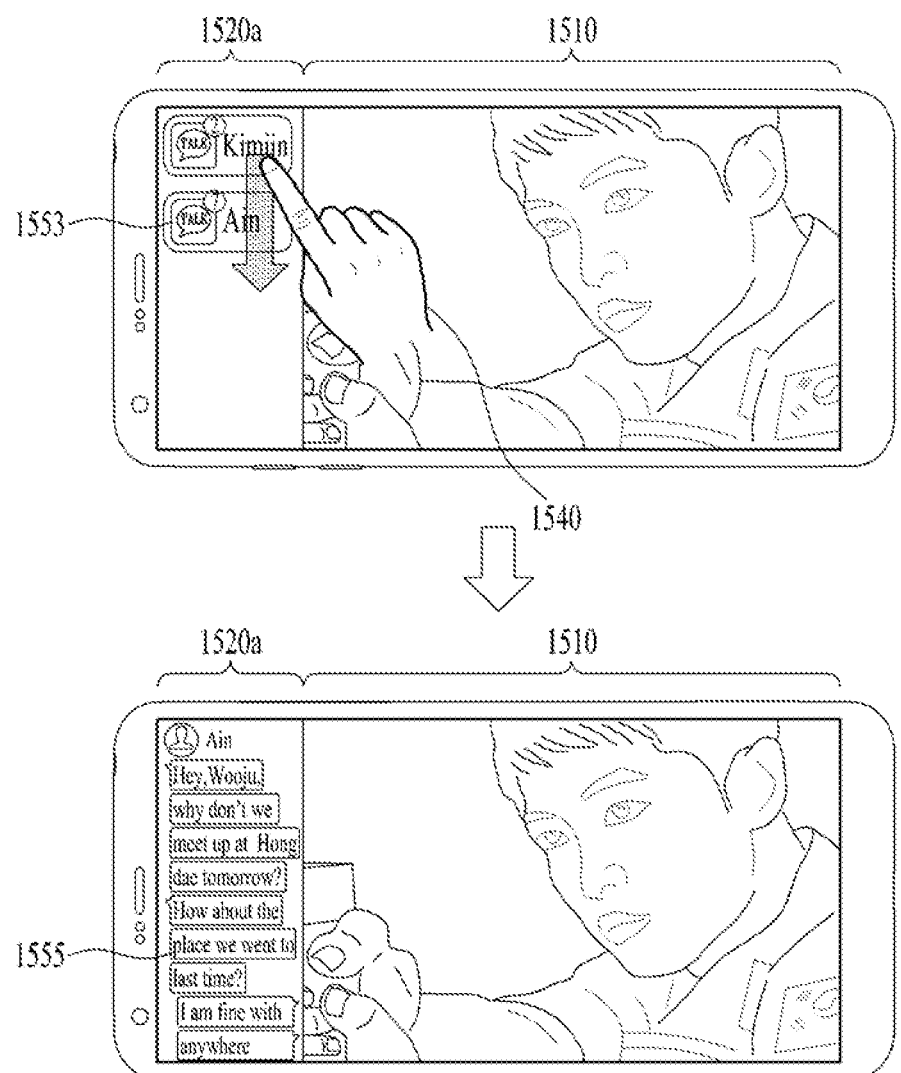
FIG. 15 is a diagram illustrating a further embodiment of displaying detailed information of an icon on a first area of the mobile terminal according to one embodiment of the present invention.

FIG. 15 is a diagram illustrating a further embodiment of displaying detailed information of an icon on a first area of the mobile terminal according to one embodiment of the present invention. To avoid redundant description, the features already mentioned in FIGS. 4 to 14 shall be omitted in the embodiment of FIG. 15.

The first drawing of FIG. 15 may correspond to the second drawing of FIG. 14. That is, FIG. 15 shows an embodiment of displaying different detailed information on a first area 1520a by receiving a different input signal in the same situation as in the second drawing of FIG. 14.

Referring to the first drawing of FIG. 15, the mobile terminal may display first detailed information 1553 of a first icon on the first area 1520a and playback a video on a center area 1510.

According to one embodiment of the present invention, the mobile terminal may sense a first input signal 1540 for selecting the first detailed information 1553. In this case, the first input signal 1540 may be a touch input signal of dragging one item in the first detailed information 1553 of the first icon on the first area 1520a in a first direction. For instance, a user may touch-drag the first detailed information 1553 displayed on the first area 1520a from the top to the bottom.

Referring to the second drawing of FIG. 15, after sensing the first input signal 1540, the mobile terminal may output third detailed information 1555 through the first area 1520a. In this case, the third detailed information 1555 may include events received by an application associated with the first detailed information 1553 displayed on the first area 1520a. For example, if the application corresponding to the first icon is a messenger application, the third detailed information 1555 may contain messages received through the messenger application.

According to one embodiment of the present invention, whenever the mobile terminal receives a new message through the messenger application corresponding to the first icon, the mobile terminal may display the received messages on the first area 1520a in chronological order.

Figure 16:
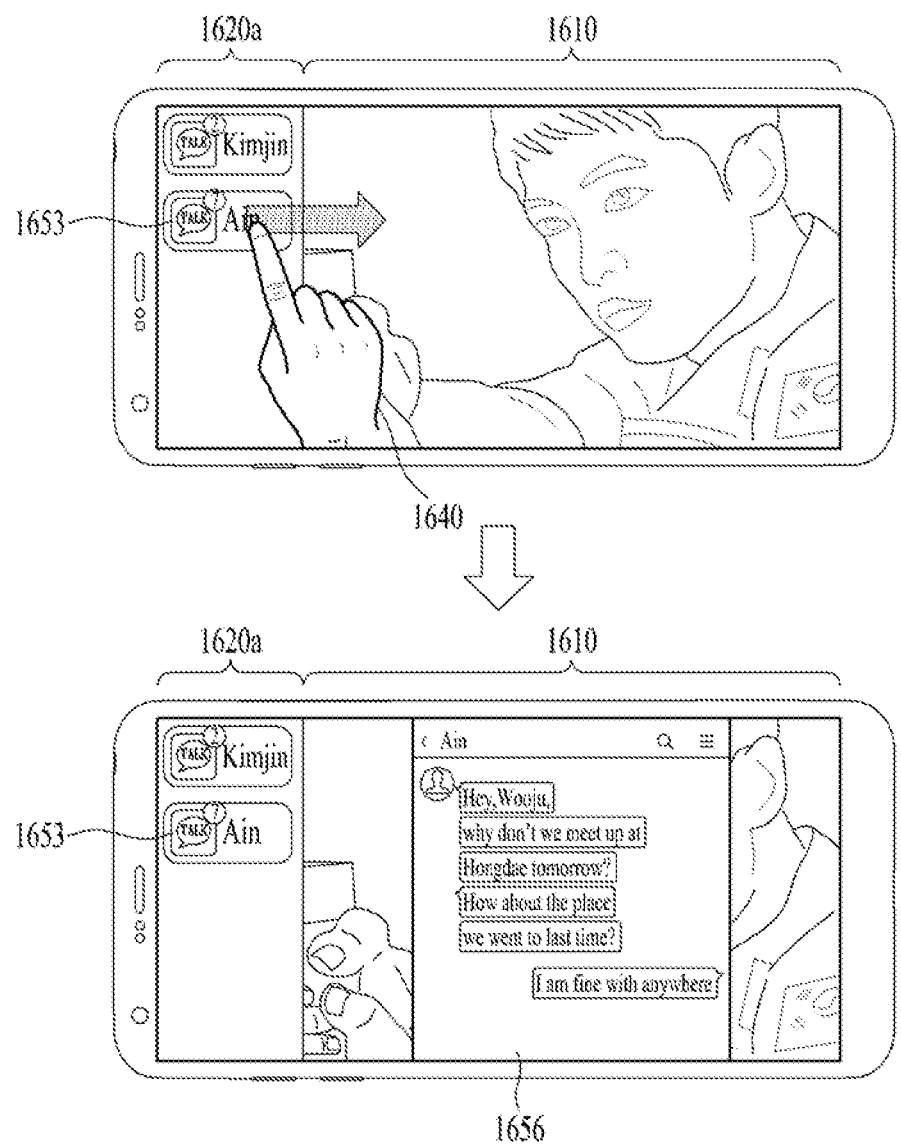
FIG. 16 is a diagram illustrating an embodiment of displaying detailed information of an icon on a center area of the mobile terminal according to one embodiment of the present invention.

FIG. 16 is a diagram illustrating an embodiment of displaying detailed information of an icon on a center area of the mobile terminal according to one embodiment of the present invention. To avoid redundant description, the features already mentioned in FIGS. 4 to 15 shall be omitted in the embodiment of FIG. 16.

The first drawing of FIG. 16 may correspond to the second drawing of FIG. 14. That is, unlike FIGS. 14 and 15, FIG. 16 shows an embodiment of displaying different detailed information on a center area 1610 by receiving a different input signal.

Referring to the first drawing of FIG. 16, the mobile terminal may display first detailed information 1653 of a first icon on a first area 1620a and playback a video on the center area 1610.

According one embodiment of the present invention, the mobile terminal may sense a first input signal 1640 for selecting the first detailed information 1653. In this case, the first input signal 1640 may be a touch input signal of dragging one item in the first detailed information 1653 of the first icon on the first area 1620a in a second direction. Here, the second direction may be opposite to the first direction of FIG. 15.

In addition, the first input signal 1640 may be a touch input signal of dragging one item in the first detailed information 1653 of the first icon in the second direction by a predetermined distance or more. For example, a user may touch-drag one item in the first detailed information 1553 displayed on the first area 1620a in the direction from the first area 1620a to the center area 1610 by the predetermined distance or more.

Referring to the second drawing of FIG. 16, after sensing the first input signal 1640, the mobile terminal may output fourth detailed information 1656 through the center area 1610. In this case, the fourth detailed information 1656 may include sub-information of the first detailed information 1653 selected by the first input signal 1640. For instance, if the first detailed information 1653 indicates the sender of the message received by the messenger application corresponding to the first icon, the fourth detailed information 1656 may correspond to a chat window including chat contents with the sender.

That is, while watching the video on the center area 1610, the user may check events received by the messenger application through the first area 1620a. In addition, while checking the event, the user may select an event, which the user needs to reply to, and then check the event through the center area 1610.

Figure 17:
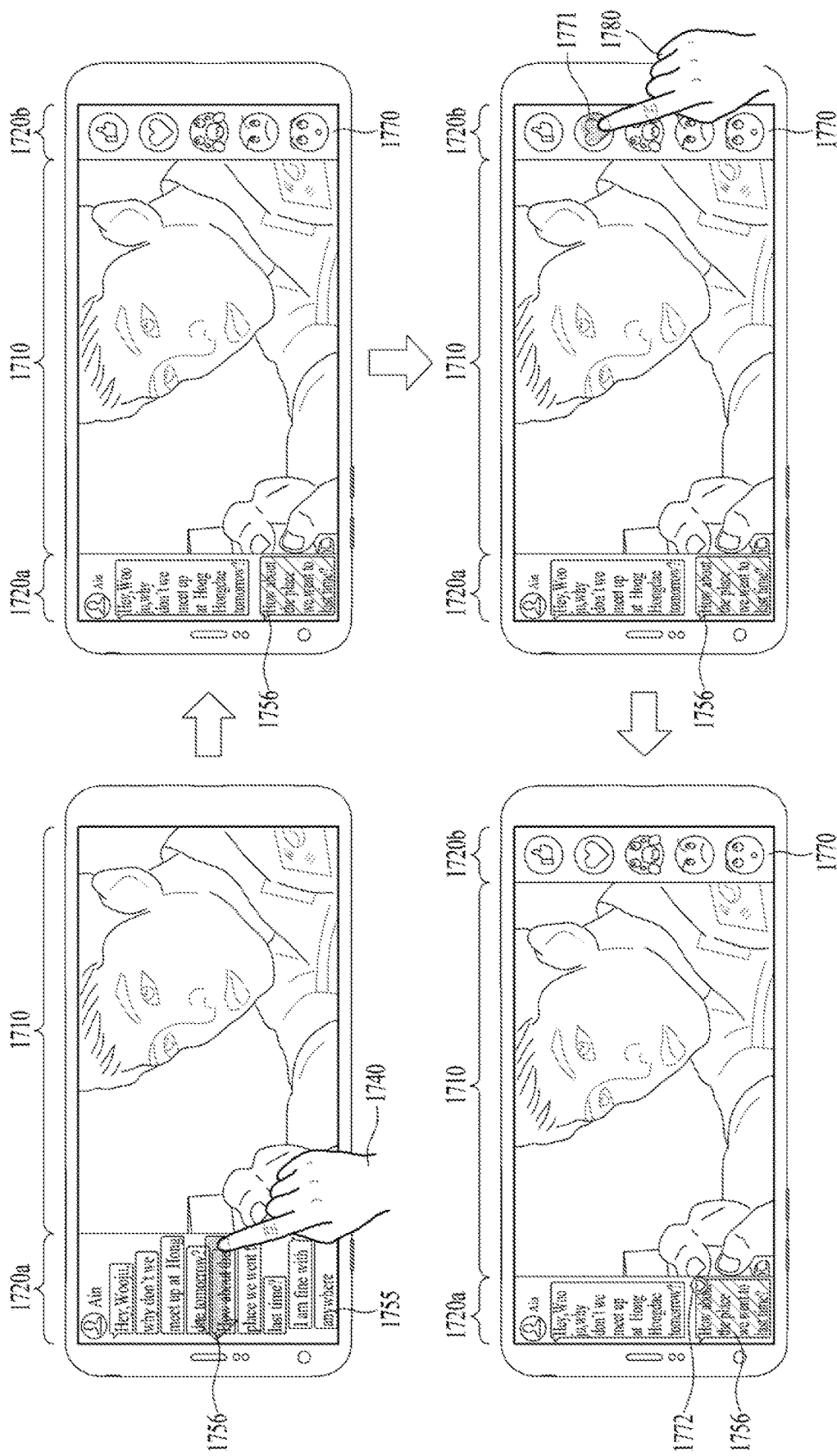
FIG. 17 is a diagram illustrating an embodiment of displaying an emoji on a first area of the mobile terminal according to one embodiment of the present invention.

FIG. 17 is a diagram illustrating an embodiment of displaying an emoji on a first area of the mobile terminal according to one embodiment of the present invention. To avoid redundant description, the features already mentioned in FIGS. 4 to 16 shall be omitted in the embodiment of FIG. 17.

The first drawing of FIG. 17 may correspond to the second drawing of FIG. 15. That is, the mobile terminal may output third detailed information 1755 through a first area 1720a and playback a video on a center area 1710. According to the aforementioned embodiments, the third detailed information 1755 may be at least one message received through the messenger application.

According to one embodiment of the present invention, the mobile terminal may sense a first input signal 1740 for selecting a first message 1756 in the third detailed information 1755. In this case, the first input signal 1740 may be a touch input signal of dragging the first message 1756 in a first direction after the selection. For instance, the first direction may be equal to the direction from the right to the left.

Referring to the second drawing of FIG. 17, after sensing the first input signal 1740, the mobile terminal may reduce a size of the first area 1720a and display at least one emoji 1770 associated with the third detailed information 1755 on a second area 1720b. In detail, the mobile terminal may display the at least one emoji 1770 associated with the first message 1756 selected by the first input signal 1740.

As the size of the first area 1720a is reduced, the mobile terminal may also reduce the third detailed information 1755 displayed on the first area 1720a. According to a direction of the first input signal 1740, sizes of the first and second areas 1720a and 1720b can be adjusted and the location of the center area 1710 can also be changed as described above in the embodiments.

According to one embodiment of the present invention, the mobile terminal may display the first message 1756 located at a point where the first input signal 1740 is inputted in a different way to distinguish it from other messages. For instance, after sensing the first input signal 1740, the mobile terminal may display the first message 1756 using a color different from that used in other message included in the third detailed information 1755.

Referring to third drawing of FIG. 17, the mobile terminal may sense a second input signal 1780 for selecting a first emoji 1771 from the at least one emoji 1770. In this case, the second input signal 1780 may be an input signal of touching the first emoji 1771. In addition, the mobile terminal may be displaying the first message 1756 in the different way to distinguish it from other messages.

Referring to the fourth drawing of FIG. 17, after sensing the second input signal 1780, the mobile terminal may send the first emoji 1771 to the sender who has transmitted the first message 1756. In detail, after sensing the second input signal 1780 for selecting the first emoji 1771, the mobile terminal may send the first emoji 1771 to the sender of the first message 1756, which is distinguished from other messages in advance.

According to one embodiment of the present invention, after sensing the second input signal 1780, the mobile terminal may display an indicator 1772 corresponding to the first emoji 1771 on the first message 1756.

Thus, if an event of another application is received while a user watches the video on the center area 1710, the user may check the received event through the first area 1720a. In addition, when the user needs to send a response, the user may send the response using at least one emoji 1770 displayed on the second area 1720b in a simple manner.

Figure 18:
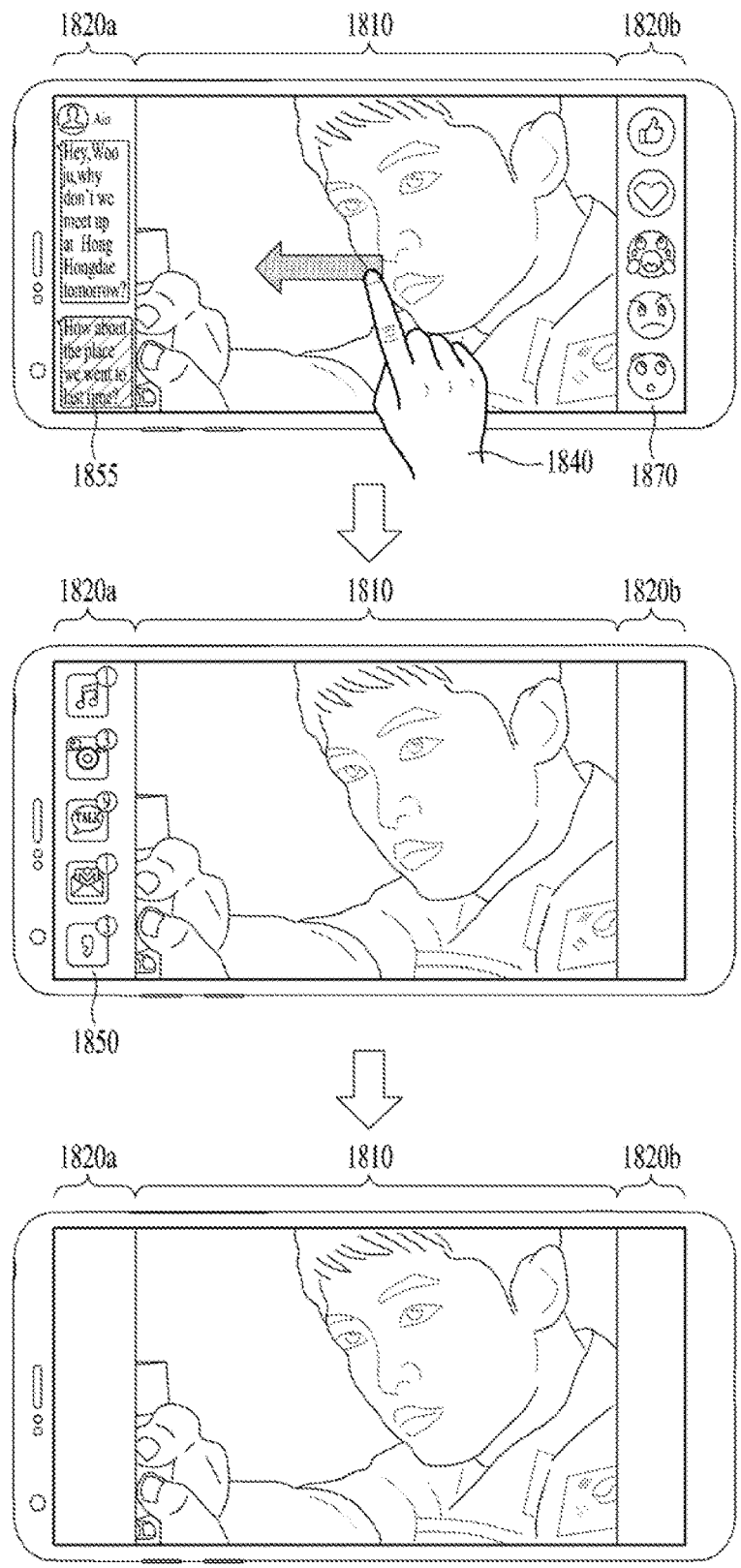
FIG. 18 is a diagram illustrating an embodiment of terminating display of an object on the mobile terminal according to one embodiment of the present invention.

FIG. 18 is a diagram illustrating an embodiment of terminating display of an object on the mobile terminal according to one embodiment of the present invention. To avoid redundant description, the features already mentioned in FIGS. 4 to 17 shall be omitted in the embodiment of FIG. 18.

The first drawing of FIG. 18 may correspond to the third drawing of FIG. 17. That is, while performing playback of a video on a center area 1810, the mobile terminal may display third detailed information 1855 on a first area 1820a and at least one emoji 1870 on a second area 1820b.

According to one embodiment of the present invention, the mobile terminal may sense a first input signal 1840 corresponding to a touch drag in a first direction on the touch screen. In this case, the first direction may be the direction from the right to the left. Details are the same as those described above.

Referring to the second drawing of FIG. 18, after sensing the first input signal 1840, the mobile terminal may display a first icon group 1850 on the first area 1820a and stop display of the at least one emoji 1870 on the second area 1820b.

In detail, after sensing the first input signal 1840, the mobile terminal may stop display of the third detailed information 1855 on the first area 1820a and output the first icon group 1850 containing at least one icons, which has the highest depth in the third detailed information 1855.

In detail, after sensing the first input signal 1840, the mobile terminal may stop the display of the at least one emoji 1870 on the second area 1820b because there is no highest depth in the at least one emoji 1870.

In other words, according to the embodiment of FIG. 18, after sensing the first input signal 1840, the mobile terminal may switch the third detailed information 1855 and the at least one emoji 1870, which are respectively displayed on the first area 1820a and the second area 1820b, to an object with the highest depth.

Referring to the third drawing of FIG. 18, if there is no input signal during a predetermined time while the mobile terminal displays the first icon group 1850 on the first area 1820a and nothing on the second area 1820b, the mobile terminal may stop display of the object on the first area 1820a and the second area 1820b.

That is, the mobile terminal may display the video only on the center area 1810 while leaving on the first area 1820a and the second area 1820b as an empty space.

Moreover, it is apparent that the embodiment of stopping display of objects on the first area 1820a and the second area 1820b when there is no input signal during the predetermined time while the mobile terminal displays the objects on at least one of the first area 1820a and the second area 1820b can be applied to all the above-mentioned embodiments.

Figure 19:
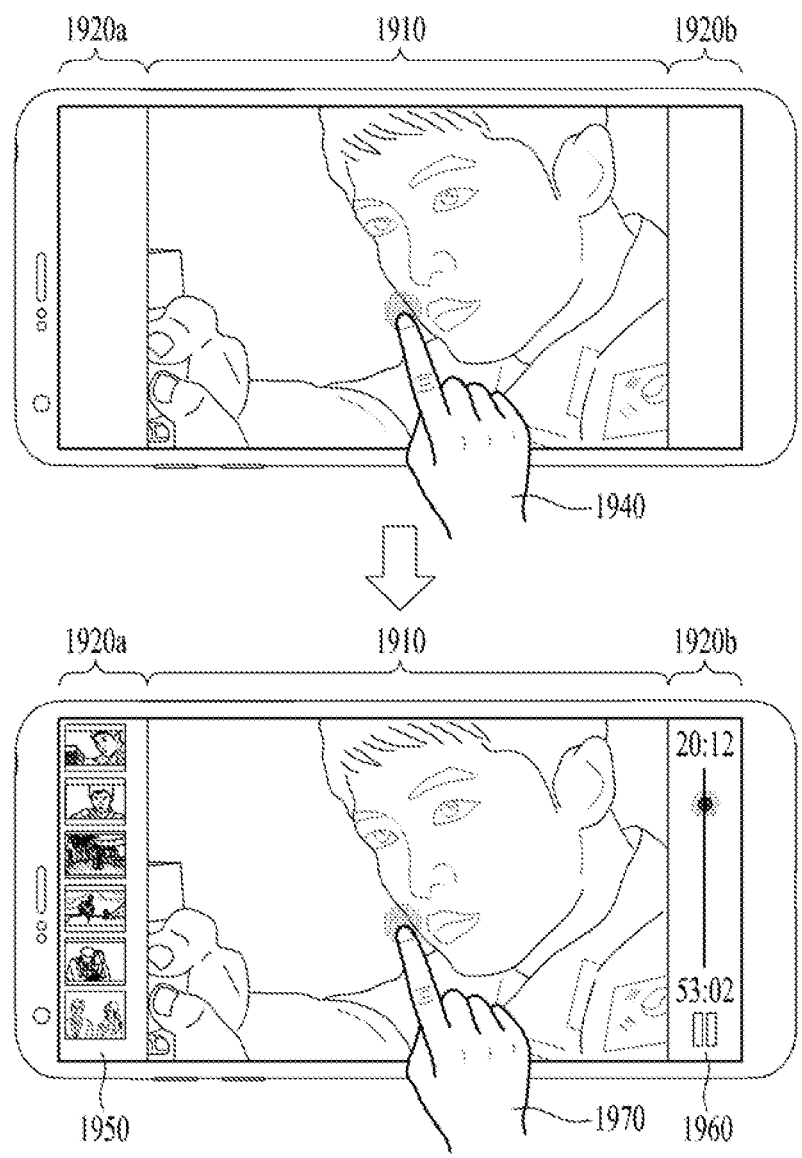
FIG. 19 is a diagram illustrating another embodiment of terminating display of an object on the mobile terminal according to one embodiment of the present invention.

FIG. 19 is a diagram illustrating another embodiment of terminating display of an object on the mobile terminal according to one embodiment of the present invention. To avoid redundant description, the features already mentioned in FIGS. 4 to 18 shall be omitted in the embodiment of FIG. 19.

The first drawing of FIG. 19 may correspond to the first drawing of FIG. 5 or the third drawing of FIG. 18. That is, the mobile terminal may virtually partition the touch screen into a center area 1910 and side areas 1920a and 1920b. In addition, the mobile terminal may perform playback of a video content on the center area 1910 of the touch screen.

According to one embodiment of the present invention, the mobile terminal may sense a first input signal 1940 for selecting a random point in the center area 1910. Details are the same as those described above.

Referring to the second drawing of FIG. 19, after sensing the first input signal 1940, the mobile terminal may display at least one object on the side areas 1920a and 1920b of the touch screen.

In detail, after sensing the first input signal 1940, the mobile terminal may display a preview thumbnail 1950 of the video played on the center area 1910 on the first area 1920a. In addition, after sensing the first input signal 1940, the mobile terminal may display a controller 1960 for controlling the video played on the center area 1910 on the second area 1920b.

According to one embodiment of the present invention, the mobile terminal may sense a second input signal 1970 for selecting a random point in the center area 1910. In this case, the second input signal 1970 may be the same type of signal as the first input signal 1940.

For example, if the first input signal 1940 is an input signal of touching the center area 1910 once, the second input signal 1970 may be the input signal of touch the center area 1910 once.

Since the same touching manner is adopted for the first input signal 1940 and the second input signal 1970, the mobile terminal may recognize that the first input signal 1940 and the second input signal 1970 are the same type of signal even though they are inputted through different points in the center area 1910.

According to one embodiment of the present invention, after sensing the second input signal 1970, the mobile terminal may stop display of objects on the first area 1920a and the second area 1920b. In detail, after sensing the second input signal 1970, the mobile terminal may stop display of the preview thumbnail 1950 and the controller 1960 on the first area 1920a and the second area 1920b, respectively.

According to one embodiment of the present invention, the mobile terminal may switch from the state illustrated in the first drawing of FIG. 19 to the state illustrated in the second drawing of FIG. 19 based on the first input signal 1940 and also switch from the latter state to the former state based on the second input signal 1970.

Therefore, a user may use the preview thumbnail 1950 or the controller 1960 by touching the center area 1910. After completing the use of the preview thumbnail 1950 or the controller 1960, the user may be absorbed in watching the video by touching the central region 1910 again.

FIG. 20 is a flowchart for explaining an embodiment of displaying an object based on an input signal on a side area of the mobile terminal according to one embodiment of the present invention. Each step described below with reference to FIG. 20 may be controller by the controller of FIG. 1A.

In step S2010, a mobile terminal may partition a touch screen into a center area and a side area. In this case, the side area may be the remaining area of the touch screen except the center area. In addition, the side area may be composed of one or more areas. For example, the side area may include the left side area and the right side area. However, in this case, the touch screen is partitioned into the center area and the side area virtually rather than physically.

In step S2020, the mobile terminal may display a content on the center area. In this case, the content may be a video playback application. That is, the mobile terminal may perform playback of a video on the center area of the touch screen through the video playback application.

In step S2030, the mobile terminal may sense a first input signal for selecting one of the center area and the side area. Specifically, the mobile terminal may sense the first input signal for selecting one of the center area and the side area while performing the playback of the video on the center area. For example, a user may touch a random point of the center area or the side area while watching the video.

In step S2040, the mobile terminal may output at least one object through the side area based on the first input signal.

In detail, when sensing the first input signal for selecting the center area, the mobile terminal may output an object associated the content displayed on the center area through the side area. For example, after sensing the first input signal for selecting the center area, the mobile terminal may display a preview thumbnail associated with the video and a video playback controller.

On the other hand, when sensing the first input signal for selecting the side area, the mobile terminal may output an object that is not associated with the content displayed on the center area through the side area. For instance, after sensing the first input signal for selecting one of side areas, the mobile terminal may display an icon corresponding to an application capable of receiving an event and a controller for system control. Details are the same as those described above.

Further, it is apparent that the embodiments described above with reference to FIGS. 5 to 19 can be implemented based on the controlling method for the mobile terminal described in FIG. 20.

The present invention mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. The foregoing embodiments are merely exemplary and are not to be considered as limiting the present disclosure. The present teachings can be readily applied to other types of methods and apparatuses. Thus, it is intended that the present invention covers the modifications and variations of this invention that come within the scope of the appended claims and their equivalents.

What is claimed is:
1. A mobile terminal comprising:
   a sensing unit;
   a touch screen configured to be partitioned into a center area, a first side area and a second side area, the first side area being opposite to the second side area; and
   a control unit configured to:
   sense a first input signal for selecting one of the center area and the first side area while playing a video on the center area, in response to the first input signal for selecting the center area while the video is playing, display at least one preview thumbnail of the video on the first side area based on the first input signal, in response to a remaining playback time of the video being equal to or smaller than a predetermined time, replace the at least one preview thumbnail of the video with a recommended video list including a plurality of video thumbnails on the first side area, in response to selecting a first video thumbnail among the plurality of video thumbnails, display a first video on the center area, the first video being different than the video played on the center area, and in response to a touch-drag input to the touch screen in a first direction towards the first side area, eliminate the first side area by expanding the center area playing the video to include the first side area and expand the second side area.

2. The mobile terminal of claim 1, wherein in response to the first input signal for selecting the center area, the control unit is further configured to display a first icon for controlling the video.

3. The mobile terminal of claim 2, wherein the control unit is configured to:
display the first icon on the second side area.

4. The mobile terminal of claim 3, wherein in response to the control unit sensing a second input signal, which is inputted on the center area in a predetermined manner, while displaying the at least one preview thumbnail, the control unit is configured to:
replace the at least one preview thumbnail with a second icon for controlling the video on the first side area.

5. The mobile terminal of claim 1, wherein in response to the first input signal for selecting the first side area, the controller is further configured to display one or more video category icons.

6. The mobile terminal of claim 5, wherein the control unit is configured to:
display at least one icon on the first side area; and
display the one or more video category icons on the second side area.

7. The mobile terminal of claim 6, further comprising a wireless communication unit,
wherein the control unit is configured to:
display a first icon on the first side area; and
display a notification badge on the first icon when receiving an event associated with the first icon through the wireless communication unit.

8. The mobile terminal of claim 7, wherein when sensing a fourth input signal for selecting the first icon, the control unit is configured to display detailed information of the first icon on the first side area.

9. The mobile terminal of claim 7, wherein when sensing a fifth input signal corresponding to a drag of the first icon by a predetermined distance or more, the control unit is configured to display detailed information of the first icon on the center area.

10. The mobile terminal of claim 8, wherein when sensing a sixth input signal for selecting the detailed information of the first icon, the control unit is configured to display at least one emoji associated with the detailed information of the first icon on the second side area.

11. The mobile terminal of claim 6, wherein when sensing a seventh input signal corresponding to a drag in a second direction on the touch screen, the control unit is configured to adjust the number of the one or more video category icons.

12. The mobile terminal of claim 11, wherein when sensing an eighth input signal corresponding to a drag in a second direction on the touch screen, the control unit is configured to have the one or more video category icons disappear.

13. The mobile terminal of claim 12, wherein the second direction of the eight input signal is an opposite direction to the second direction of the seventh input signal.

14. The mobile terminal of claim 11, wherein the number of the one or more video category icons is adjusted based on a drag distance of the seventh input signal.

15. The mobile terminal of claim 6, wherein when the control unit senses no input signal during a predetermined time while displaying the at least one icon, the control unit is configured to have the at least one icon disappear.

16. The mobile terminal of claim 1, wherein when sensing an input signal identical to the first input signal, the control unit is configured to have the at least one preview thumbnail disappear.

17. A method for controlling a mobile terminal, the method comprising:
partitioning a touch screen into a center area, a first side area and a second side area, the first side area being opposite to the second side area;
playing a video on the center area;
sensing a first input signal for selecting one of the center area and the first side area;
in response to the first input signal for selecting the center area while the video is playing, displaying at least one preview thumbnail of the video on the first side area based on the first input signal;
in response to a remaining playback time of the video being equal to or smaller than a predetermined time, replacing the at least one preview thumbnail of the video with a recommended video list including a plurality of video thumbnails on the first side area;
in response to selecting a first video thumbnail among the plurality of video thumbnails, displaying a first video on the center area, the first video being different than the video played on the center area; and
in response to a touch-drag input to the touch screen in a first direction towards the first side area, eliminating the first side area by expanding the center area playing the video to include the first side area and expanding the second side area.

* * * * *